(12) United States Patent
Abe

(10) Patent No.: US 12,511,003 B2
(45) Date of Patent: Dec. 30, 2025

(54) ELECTRONIC APPARATUS AND ELECTRONIC APPARATUS SET

(71) Applicant: NINTENDO CO., LTD., Kyoto (JP)

(72) Inventor: Takehiro Abe, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 18/960,664

(22) Filed: Nov. 26, 2024

(65) Prior Publication Data

US 2025/0085824 A1  Mar. 13, 2025

Related U.S. Application Data

(63) Continuation of application No. PCT/JP2022/021642, filed on May 26, 2022.

(51) Int. Cl.
*G06F 3/044* (2006.01)
*G06F 3/041* (2006.01)

(52) U.S. Cl.
CPC .......... *G06F 3/0446* (2019.05); *G06F 3/0418* (2013.01); *G06F 2203/04104* (2013.01)

(58) Field of Classification Search
CPC ................. G06F 3/0418; G06F 3/0446; G06F 2203/04104
See application file for complete search history.

(56) References Cited

FOREIGN PATENT DOCUMENTS

| JP | 2012118850 A | 6/2012 | |
|----|---|---|---|
| JP | 2015035052 A | 2/2015 | |
| JP | 2016015129 A | 1/2016 | |
| WO | 2012139203 A1 | 10/2012 | |
| WO | WO-2016199712 A1 * | 12/2016 | ......... H03K 17/9622 |

OTHER PUBLICATIONS

Machine translation of WO 2016199712 (Year: 2025).*
International Search Report for PCT/JP2022/021642, mailed Aug. 9, 2022, 5 pages.

* cited by examiner

*Primary Examiner* — Michael Pervan
(74) *Attorney, Agent, or Firm* — Nixon & Vanderhye PC

(57) ABSTRACT

An electronic apparatus can be equipped with an input device provided with an electrode which changes in potential by an operating part being operated. The apparatus includes: a touch screen provided with a display part and a touch panel; and a processor configured to detect operation at the operating part. The touch panel detects a value of a parameter relating to an electrostatic capacitance formed between the touch panel and the electrode and changing in accordance with a change in potential of the electrode. The processor is configured to detect operation at the operating part at any timing based on a first parameter value expressed by the value of the parameter detected by the touch panel when no operating part is being operated, and a second parameter value expressed by the value of the parameter detected by the touch panel after the first parameter value is detected.

20 Claims, 14 Drawing Sheets

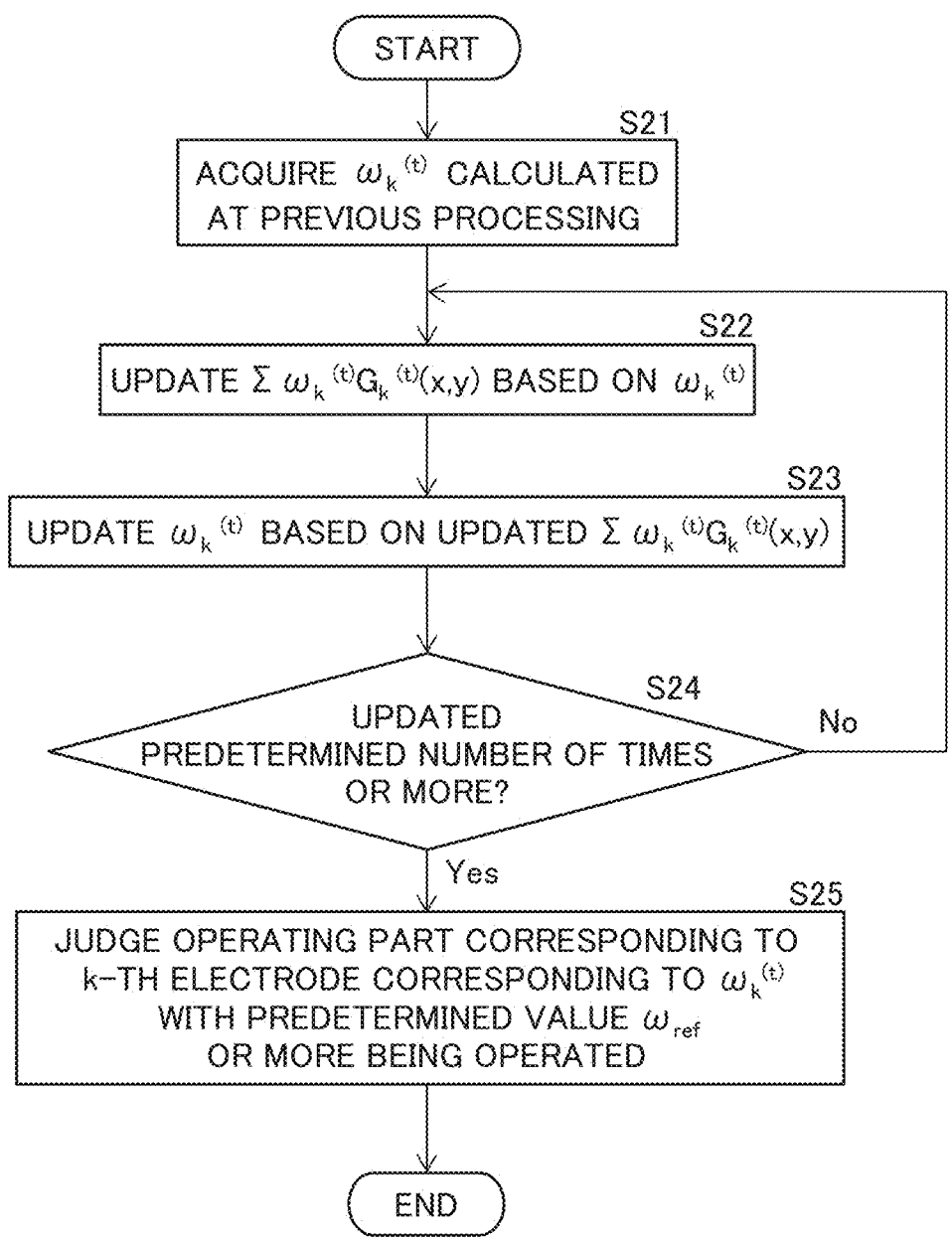

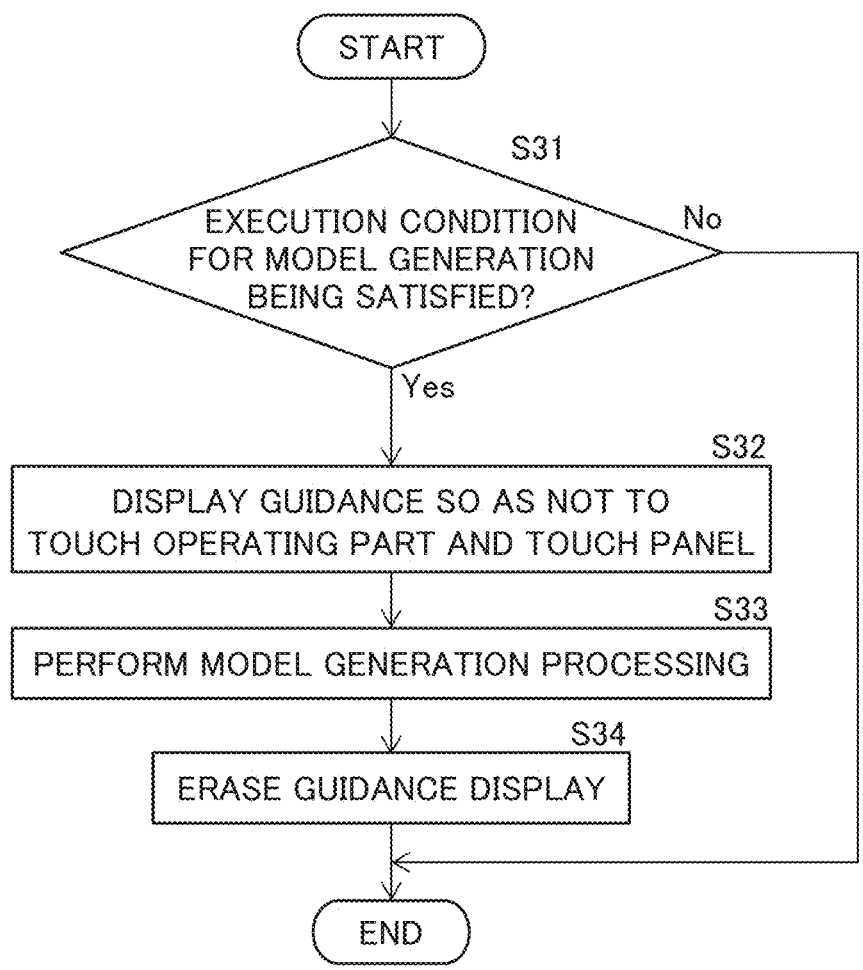

ELECTRONIC APPARATUS AND ELECTRONIC APPARATUS SET

CROSS-REFERENCE TO RELATED APPLICATION

The present application is a continuation of International Patent Application No. PCT/JP2022/021642 filed on May 26, 2022, which is incorporated herein by reference in its entirety.

FIELD

The present disclosure relates to an electronic apparatus and electronic apparatus set.

BACKGROUND AND SUMMARY

Known in the past has been electrostatic capacitance type touch panel to which instructions are input by buttons or the like provided at the outside of the touch panel. In particular, in the apparatus, if a directional button or push buttons are physically operated, the electrostatic capacitance between a touch panel and a pad connected to the directional button or push buttons will change, and as a result, the input to the touch panel is performed.

An electrostatic capacitance type touch panel is produced assuming a person will touch the touch panel. Therefore, if input to the touch panel is performed by using an input device utilizing the pad connected to buttons as explained above or the like, there is a possibility that the input from the input device to the touch panel will not be able to be detected with a high precision.

One aspect of certain example embodiments relates to providing an electronic apparatus having an improved touch panel. For instance, one aspect of certain example embodiments relates to techniques for increasing the precision of detection of input from an input device to a touch panel.

Certain example embodiments provide the following combinations of features:

(1) An electronic apparatus which can be equipped with an input device provided with an electrode which changes in potential by an operating part being operated, the electronic apparatus comprising:
a touch screen provided with a display part configured to display an image and an electrostatic capacitance type touch panel arranged at a position superposed with the display part; and
a detection part (e.g., implemented using a processor) configured to detect operation at the operating part, wherein
the touch panel is configured to detect a value of a parameter relating to an electrostatic capacitance formed between a region of the touch panel corresponding to the electrode and the electrode and changing in accordance with a change in potential of the electrode in a state where the input device is attached to the electronic apparatus, and
the detection part (e.g., the processor) is configured to detect operation at the operating part at any timing based on a first parameter value expressed by the value of the parameter detected by the touch panel when no operating part is being operated in the state where the input device is attached to the electronic apparatus, and a second parameter value expressed by the value of the parameter detected by the touch panel at any timing after the first parameter value is detected in the state where the input device is attached to the electronic apparatus.

(2) The electronic apparatus according to above (1), wherein
the input device is provided with a plurality of operating parts and a plurality of electrodes corresponding to the operating parts,
the plurality of electrodes are arranged at different positions of the touch panel in the state where the input device is attached to the electronic apparatus, and
the detection part (e.g., the processor) is configured to detect the operation at the operating part corresponding to each electrode based on the value of the parameter corresponding to the electrostatic capacitance corresponding to each electrode among the first parameter values, and the value of the parameter corresponding to the electrostatic capacitance corresponding to each electrode among the second parameter values.

(3) The electronic apparatus according to above (1) or (2), wherein the detection part includes:
a model generation part for generating a mathematical distribution model relating to distribution of the first parameter value based on the first parameter value; and
a model usage detection part for detecting the operation at the operating part based on the mathematical distribution model generated by the model generation part and the second parameter value.
Each of these parts may be implemented by the processor.

(4) The electronic apparatus according to above (3), wherein the mathematical distribution model is a normal distribution model.

(5) The electronic apparatus according to above (4), wherein the normal distribution model is a mixed normal distribution model.

(6) The electronic apparatus according to any one of above (3) to (5), wherein
the input device is provided with a plurality of electrodes configured to change in potential by a plurality of operating parts being operated,
the plurality of electrodes are arranged at different positions of the touch panel in the state where the input device is attached to the electronic apparatus, and
the model generation part is configured to generate the mathematical distribution model as a set of partial mathematical distribution model corresponding to each electrode based on the first parameter value.

(7) The electronic apparatus according to above (6), wherein the partial mathematical distribution model is a mixed normal distribution model.

(8) The electronic apparatus according to above (6) or (7), wherein the model usage detection part is configured to break down a second parameter value into a distribution of the value of the parameter corresponding to the electrostatic capacitance expressed by the partial mathematical distribution model corresponding to each electrode when no operating part is being operated, and a strength ratio of the value of the parameter corresponding to the electrostatic capacitance corresponding to each electrode in the second parameter value with respect to the value of the parameter, and is configured to detect the operation of the operating part corresponding to each electrode based on the strength ratio.

(9) The electronic apparatus according to above (8), wherein the model usage detection part is configured to use a non-negative matrix factorization to break down the second parameter value.

(10) The electronic apparatus according to above (6) or (7), wherein the model usage detection part is configured to generate a filter for extracting the value of the parameter corresponding to the electrostatic capacitance corresponding to each electrode from the second parameter value based on the mathematical distribution model generated by the model generation part, apply the filter to the second parameter value detected by the touch panel to calculate the value of the parameter corresponding to the electrostatic capacitance corresponding to each electrode, and detect the operation at the operating part corresponding to each electrode based on the value of the parameter corresponding to the electrostatic capacitance corresponding to each electrode calculated from the second parameter value and the partial mathematical distribution model corresponding to each electrode.

(11) The electronic apparatus according to any one of above (1) to (10), wherein
the electronic apparatus is further provided with an information processing part (e.g., a processor) configured to control display of the display part,
the information processing part is configured to control the display part to display guidance discouraging a user from operating an operating part when a detection condition for detecting the first parameter value stands, and
the detection part is configured to detect the value of a parameter detected by the touch panel during display of guidance as the first parameter value.

(12) The electronic apparatus according to any one of above (1) to (11), wherein
the electronic apparatus further comprises an information processing part (e.g., a processor) configured to control display of the display part,
the information processing part is configured to control the display part to display guidance discouraging a user from touching the touch panel when a detection condition for detecting the first parameter value is satisfied, and
the detection part is configured to detect the value of the parameter detected by the touch panel during display of the guidance as the first parameter value.

(13) The electronic apparatus according to above (11) or (12), wherein
the information processing part is configured to perform processing according to an application program utilizing operating information of the operating part, and
the detection condition is satisfied when the application program is started up.

(14) An electronic apparatus set comprising an input device and an electronic apparatus which can be equipped with the input device, wherein
the input device includes an operating part to be operated by the user, and an electrode changing in potential by the operating part being operated,
the electronic apparatus includes a touch screen provided with a display part configured to display an image and an electrostatic capacitance type touch panel arranged at a position superposed with the display part, and a detection part (e.g., implemented using a processor) for detecting operation at the operating part,
the touch panel is configured to detect a value of a parameter relating to an electrostatic capacitance formed between a region of the touch panel corresponding to the electrode and the electrode and changing in accordance with a change in potential of the electrode in the state where an input device is attached to the electronic apparatus, and
the detection part is configured to detect operation at the operating part at any timing based on a first parameter value expressed by the value of the parameter detected by the touch panel when no operating part is being operated in the state where the input device is attached to the electronic apparatus, and a second parameter value expressed by the value of the parameter detected by the touch panel at any timing after the first parameter value is detected in the state where the input device is attached to the electronic apparatus.

BRIEF DESCRIPTION OF DRAWINGS

Embodiments of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 is a flow chart showing a flow of processing for detection of an operation at an operating part.

FIG. 14 is a flow chart showing a flow of processing relating to display of guidance to a display part.

DESCRIPTION OF EMBODIMENTS

Figure 1:
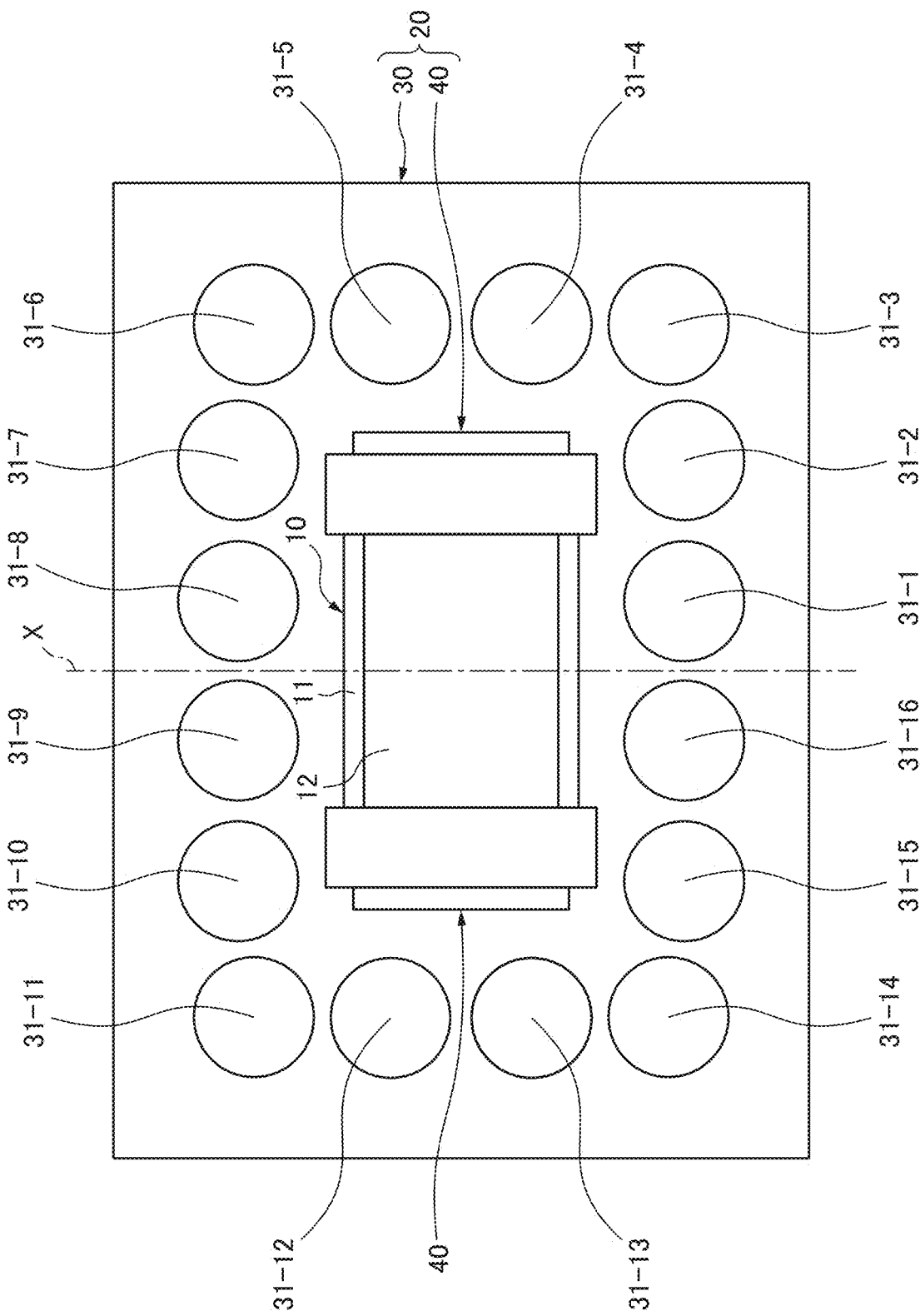
FIG. 1 is a plan view schematically showing an electronic apparatus set.

Below, referring to the drawings, embodiments will be explained in detail. Note that in the following explanation, similar component elements will be assigned the same reference notations.

Electronic Apparatus Set

Figure 2:
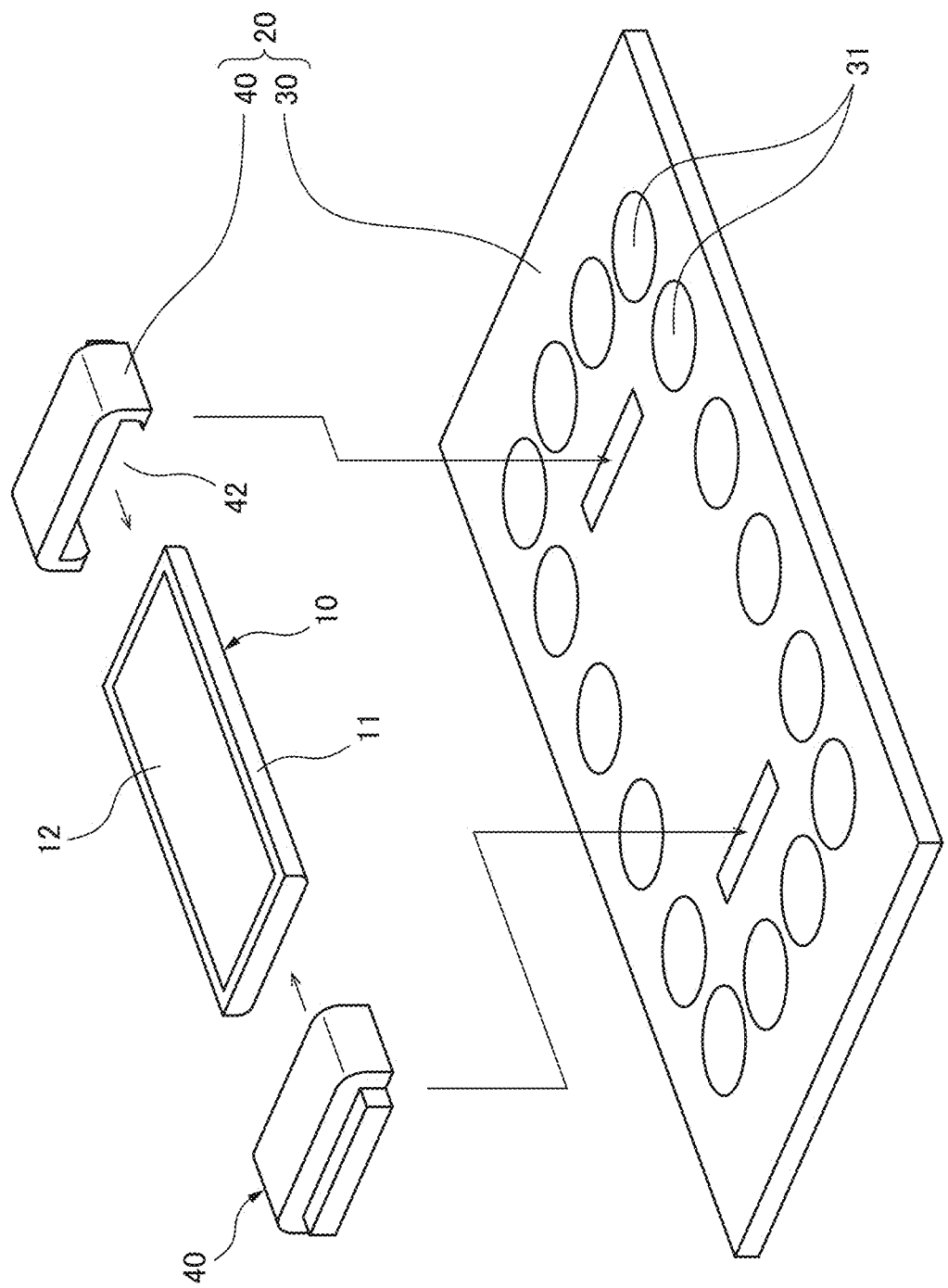
FIG. 2 is a schematic disassembled perspective view of the electronic apparatus set.

Referring to FIGS. 1 and 2, an electronic apparatus set 1 according to one embodiment will be explained. FIG. 1 is a plan view schematically showing an electronic apparatus set 1. FIG. 2 is a schematic disassembled perspective view of the electronic apparatus set 1.

As will be understood from FIGS. 1 and 2, the electronic apparatus set 1 has an electronic apparatus 10 having a touch screen 12, and an input device 20 able to be attached to the electronic apparatus 10. The input device 20 is used for input to the electronic apparatus 10 through the touch screen 12 of the electronic apparatus 10.

Electronic Apparatus

Next, referring to FIGS. 1 to 4, the electronic apparatus 10 will be explained. The electronic apparatus 10 is a substantially cuboid shaped apparatus provided with a touch screen 12. For example, the electronic apparatus 10 is a portable game machine, tablet, mobile monitor, or the like. In particular, in the present embodiment, the electronic apparatus 10 is a portable apparatus able to be used in a state placed on a floor surface, desktop surface, or other placement surface or in a state held in the hand of the user.

As shown in FIGS. 1 and 2, the electronic apparatus 10 has a substantially cuboid shaped housing 11, and a touch screen 12 provided at one side surface of the housing 11 and having a substantially rectangular shaped display screen. In particular, the touch screen 12 is provided so that the display screen is positioned over substantially the entire surface of the one side surface of the housing 11. Note that, the housing 11 may also have a shape other than a substantially cuboid shape as long as the display screen of the touch screen 12 is provided on one side surface. Therefore, the housing 11 may have a cross-section of an oval shape or the like or may have corners with chamfered shapes. Similarly, the touch screen 12 may also have a display screen of a shape other than a substantially rectangular as long as provided on one side surface of the housing 11. Therefore, the display screen of the touch screen 12 may be square, oval, or the like, or may have corners with chamfered shapes.

Figure 3:
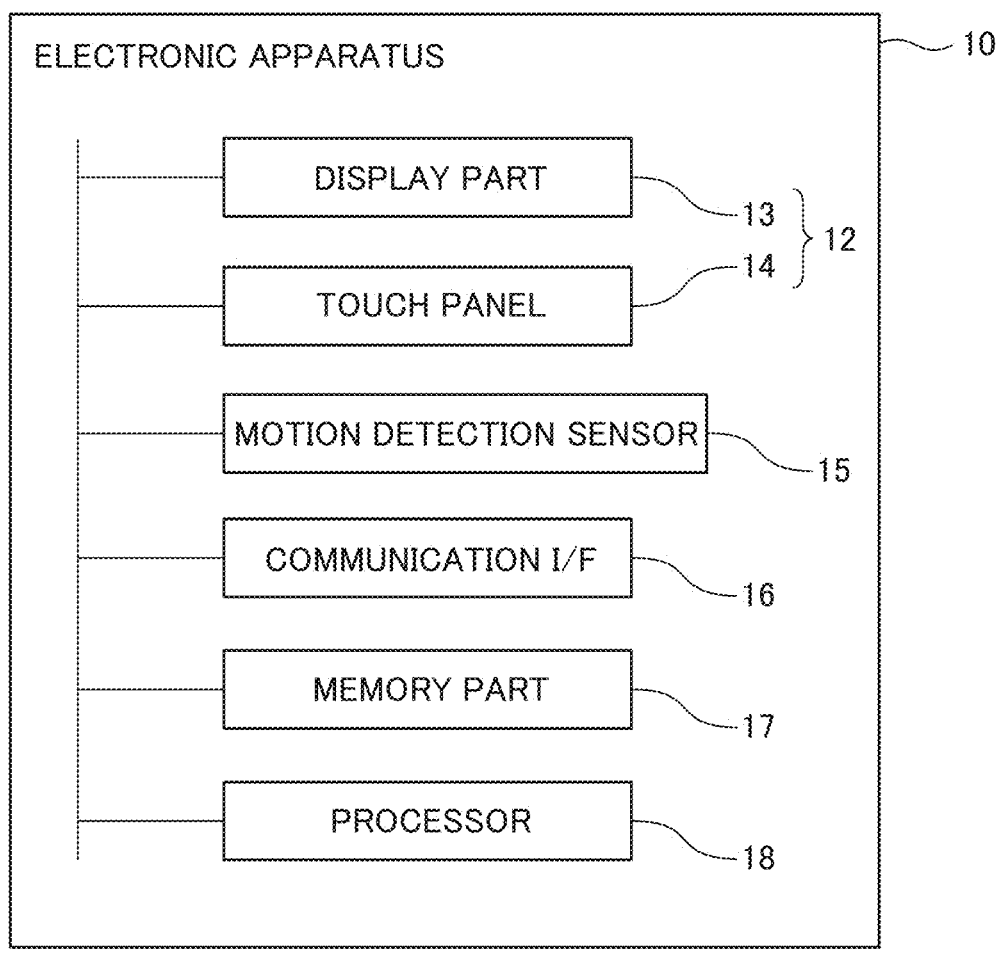
FIG. 3 is a block diagram showing the configuration of an electronic apparatus.

FIG. 3 is a block diagram showing the configuration of the electronic apparatus 10. As shown in FIG. 3, the electronic apparatus 10 has, as electronic components, a display part 13, touch panel 14, motion detection sensor 15, communication interface (communication I/F) 16, memory part 17, and processor 18. The display part 13, motion detection sensor 15, communication interface 16, and memory part 17 are connected to be able to communicate with the processor 18 through signal wires. Further, the display part 13 and the touch panel 14 configure the touch screen 12. Therefore, the touch screen 12 has the display part 13 and the touch panel 14.

The display part 13 is a device for displaying an image. For example, it is a liquid crystal display, EL (electroluminescence) display, or plasma display. The display part 13 has a flat surface and displays a still image or moving image in accordance with a signal output from the processor 18.

The touch panel 14 is arranged at a position superposed with the display part 13, in particular, in the present embodiment, is arranged over the entire surface of the display part 13. The surface of the touch panel 14 at the opposite side from the display part 13 side forms the display screen of the touch screen 12. The touch panel 14 is an electrostatic capacitance type touch panel which detects an object (human finger or the like) contacting or approaching the touch panel, based on a change of the electrostatic capacitance between the object on the surface of the touch panel 14 and the touch panel. In particular, in the present embodiment, the touch panel 14 is mutual capacitance type touch panel able to detach multiple touches.

Figure 4:
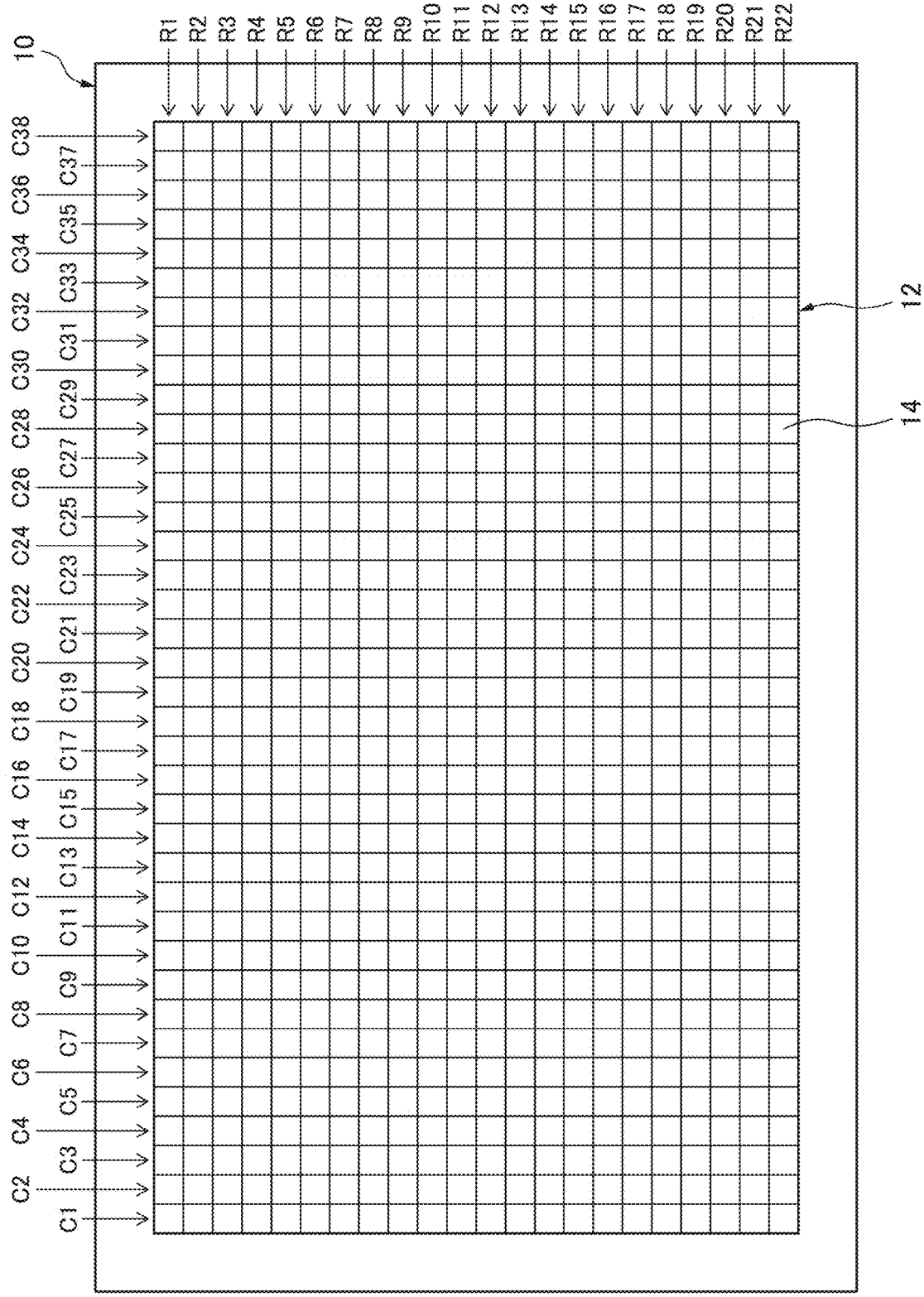
FIG. 4 shows one example of sections on a surface of a touch panel divided into a matrix.

The touch panel 14 detects a change of electrostatic capacitance accompanying the approach of an object to each section of the surface of the touch panel 14 divided into a matrix. FIG. 4 shows one example of sections of the surface of the touch panel 14 divided into a matrix. In the example shown in FIG. 4, 22 rows R1 to R22 of sections are arranged in the short side direction of the rectangular shaped touch panel 14, and 38 columns C1 to C38 of sections are arranged in the long side direction. For example, if the user touches a region at the top left of the touch panel 14 shown in FIG. 4, the electrostatic capacitance detected at the section positioned at the row R1 and column C1 and its surrounding sections changes and the fact of the user touching the section positioned at the row R1 and column C1 is detected.

In more detail, the touch panel 14 has a plurality of transparent sensor electrodes arranged in a matrix. The sensor electrodes are, for example, formed by ITO (indium tin oxide) or another transparent electroconductive material. In particular, in the present embodiment, the touch panel 14 has drive side sensor electrodes extending in the row direction, and reception side sensor electrodes extending in the column direction. These drive side sensor electrodes and reception side sensor electrodes are arranged in a lattice shape. Further, a pulse voltage is applied so that a weak electric field is generated between the drive side sensors electrode and the reception side sensor electrodes. If a human finger or other object approaches these sensor electrodes and an electrostatic capacitance is formed between the sensor electrodes and the object, the electric field generated between the sensor electrodes is decreased and the charge at the reception side sensor electrodes is decreased along with this.

Therefore, the touch panel 14 of the present embodiment detects the current changing in accordance with the charge at the reception side sensor electrodes for each section and calculates the magnitude of the electrostatic capacitance based on the detected current.

When designating the order of the sections of the matrix of the touch panel 14 in the long side direction by "x" (x=1 to X, in the example shown in FIG. 4, x=1 to 32) and designating the order in the short side direction by "y" (y=1 to Y, in the example shown in FIG. 4, y=1 to 18), the distribution C(x,y) expressing collectively the electrostatic capacitance formed for the section in the x-th place in the long side direction and y-th place in the short side direction (below, referred to as the sections (x,y) is calculated based on the following formula (1).

$$C(x, y) = \begin{cases} \text{MAX}(R^{(left)} - R(x, y), 0) & \text{if } x \in X^{(left)} \\ \text{MAX}(R^{(right)} - R(x, y), 0) & \text{if } x \in X^{(right)} \end{cases} \quad (1)$$

In the above formula (1), R(x,y) shows the distribution of the current values detected by the reception side sensor electrodes corresponding to the section (x,y). Further, $X^{(left)}$ shows the set of sections positioned at one side in the long side direction of the touch panel 14 (for example, in FIG. 4, the left side, below, referred to as the "left side") (for example, set of sections where x=1 to 5, y=1 to Y). On the other hand, $X^{(right)}$ shows the set of sections positioned at the other side in the long side direction of the touch panel 14 (for example, in FIG. 4, the right side, below, referred to as the "right side") (for example, set of sections where x=28 to 32, y=1 to Y). In addition, $R^{(left)}$ shows the reference value of the electrostatic capacitances at the left side sections included in the electrostatic capacitances $X^{(left)}$, while $R^{(right)}$ shows the reference value of the electrostatic capacitances at the right side sections included in the electrostatic capacitances $X^{(right)}$. These are expressed by the following formula (2). Note that, $\alpha$ is a predetermined constant in the following formula (2).

$$R^{(left)} = \alpha \sum_{x \in X^{(left)}, y} R(x, y), R^{(right)} = \alpha \sum_{x \in X^{(right)}, y} R(x, y) \quad (2)$$

Note that, the reference values $R^{(left)}$, $R^{(right)}$ change before and after the input device 20 is attached to the electronic apparatus 10. Therefore, when the electronic apparatus 10 is used in the state where the input device 20 is attached to the electronic apparatus 10, in particular in the state where a later explained socket 40 is attached, the distribution of the electrostatic capacitance C(x,y) is calculated using the reference values $R^{(left)}$, $R^{(right)}$ calculated after the input device 20 is attached to the electronic apparatus 10.

The touch panel 14 has an analysis circuit performing numerical calculations such as explained above, and outputs the distribution of the electrostatic capacitance C(x,y) (x=1 to X, y=1 to Y) calculated by the analysis circuit to the processor 18.

Note that, in the present embodiment, as the touch panel 14, a mutual capacitance type touch panel is used. However, as long as the touch panel 14 is an electrostatic capacitance type touch panel, a self capacitance type or any other type of touch panel can be used. Further, in the present embodiment, the sections of the touch panel 14 are arranged as shown in FIG. 4. However, the sections of the touch panel 14 can be arranged in any way as long as being formed in a matrix. Further, in the present embodiment, the sensor electrodes of the touch panel 14 are arranged in a lattice. However, the sensor electrodes may employ any known arrangement of electrodes such as the arrangement having a diamond pattern or flower pattern, and the arrangement having comb shaped drive side electrodes and reception side electrodes for each section, or the like. Further, in the present embodiment, the touch panel 14 outputs the distribution C(x,y) of the electrostatic capacitance, but may also output the value of another parameter relating to the electrostatic capacitance. For example, the touch panel 14 may also output the distribution of the distribution R(x,y) of the current values detected at the sensor electrodes. In this case, at the processor 18, the distribution C(x,y) of the electrostatic capacitance is calculated from the distribution R(x,y) of the current values.

The motion detection sensor 15 is a sensor detecting motion of the electronic apparatus 10. The motion detection sensor 15 is, for example, an acceleration sensor, gyrosensor, motion sensor, or the like.

The communication interface 16 is an interface for communication with apparatuses outside of the electronic apparatus 10. In the present embodiment, the communication interface 16, for example, is a wireless communication module for communication compliant with any communication standards (for example, Bluetooth (Registered Trademark), Wi-Fi (Registered Trademark)) established by the IEEE, ISO, IEC, or the like, so as to enable the electronic apparatus 10 to communicate wirelessly with an operating device separate from the electronic apparatus 10, or the like.

The memory part 17, for example, has a volatile semiconductor memory (for example, RAM), nonvolatile semiconductor memory (for example, ROM), or the like. Furthermore, the memory part 17 may have a hard disk drive (HDD), solid state drive (SSD), or optical recording medium. Further, a part of the memory part 17 may be a detachable removable medium. The memory part 17 stores computer programs for performing various processing at the processor 18, various data used when various processing is performed by the processor 18, or the like. The computer programs include an OS program, application programs (for example, game programs), or the like.

The processor 18 has one or more CPUs (central processing units) and their peripheral circuits. The processor 18 may further have a processing circuit such as a logical operation unit or numerical operation unit. The processor 18 performs various processing based on computer programs stored in the memory part 17.

Figure 5:
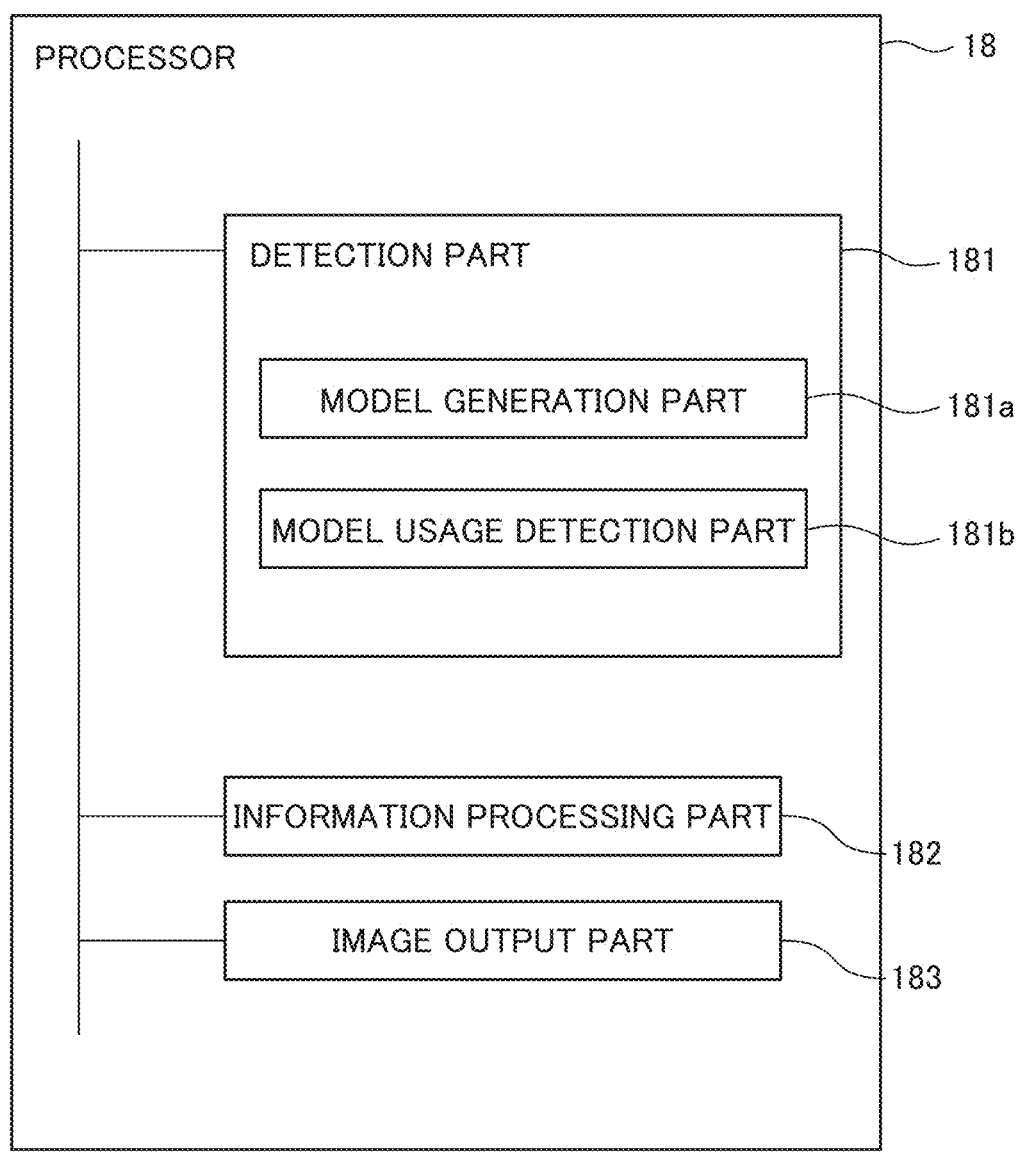
FIG. 5 is a functional block diagram of a processor.

FIG. 5 is a functional block diagram of the processor 18. As shown in FIG. 5, the processor 18 has a detection part 181, information processing part 182, and image output part 183. The detection part 181 detects an operation of a later explained operating part 31 by the user at any timing based on the electrostatic capacitance detected by the touch panel 14. The information processing part 182 performs processing based on operating information or the like at the touch panel 14 when a computer program (OS program or application program) is run. The image output part 183 outputs image data of the image to be shown at the display part 13.

The detection part 181 receives the distribution C(x,y) of the electrostatic capacitance detected by the touch panel 14 from the touch panel 14, and detects an operation at the operating part 31 by the user based on the received distribution C(x,y) of the electrostatic capacitance. The technique for detection of operation at the operating part 31 by the detection part 181 will be explained later.

The information processing part 182 receives operating information at the operating part 31 from the detection part 181. Further, the information processing part 182 takes out the necessary data from the memory part 17. The information processing part 182 performs processing in accordance with a computer program run based on the touch panel 14 and the data stored in the memory part 17, or the like. As a result, the information processing part 182 generates image data to be displayed at the display part 13 and data to be stored in the memory part 17. Therefore, the information processing part 182 controls the display of the display part 13. Note that, the information processing part 182 may generate audio data, vibration data or the like, if the electronic apparatus 10 has other notification device such as a speaker, vibration generator or the like.

The image output part 183 outputs image data generated by the information processing part 182 to the display part 13. Note that, the image output part 183 may also output image data to a separate monitor, for example, if the electronic apparatus 10 is connected to another monitor (not shown).

Input Device

Next, referring to FIGS. 1, 2, 6, and 7, the input device 20 will be explained. The input device 20 inputs instructions to the electronic apparatus 10 through the touch screen 12 of the electronic apparatus 10 in accordance with an operation at an operating part of the input device 20 by the user if there is such an operation. The input device 20 has a board 30 having a plurality of operating parts 31 and sockets 40 having pluralities of electrodes 43.

Here, FIG. 1 shows the state where the input device 20 is attached to the electronic apparatus 10, while FIG. 2 shows the state where the input device 20 is not attached to the electronic apparatus 10. As will be understood from these FIGS. 1 and 2, in the present embodiment, the sockets 40 are attached to the electronic apparatus 10 at the two short sides of the display screen of the rectangular shaped touch screen 12.

Further, as will be understood from FIGS. 1 and 2, the sockets 40 are formed to be able to be detached from the board 30. When the input device 20 is attached to the electronic apparatus 10, the sockets 40 are attached to the board 30. On the other hand, when attaching the electronic apparatus 10 to the input device 20 or when detaching the electronic apparatus 10 from the input device 20, the sockets 40 are detached from the board 30. In particular, in the present embodiment, the board 30 is formed line symmetrically up-down and left-right in FIG. 1. Further, the two sockets 40 have the same configurations. Therefore, the two sockets 40 can respectively be attached to both the left and right of the electronic apparatus 10 in FIG. 1. Further, the electronic apparatus 10 can be attached in the reverse direction in the up-down direction in FIG. 1 with respect to the board 30.

The sockets 40 are formed to be able to be fastened to the board 30 at predetermined positions by any method. Specifically, for example, magnets are embedded in the sockets 40 and metal is embedded in the board 30, whereby the sockets 40 are fixed to the board 30 by magnetic force. Alternatively, the sockets 40 may be provided with latch mechanisms and be fastened to the board 30 by the latch mechanisms engaging with claws of the board 30 or the like. In this way, the sockets 40 are formed to be able to be detached from the board 30, and due to this, the input device 20 can be easily attached to and detached from the electronic apparatus 10.

Board

Figure 6:
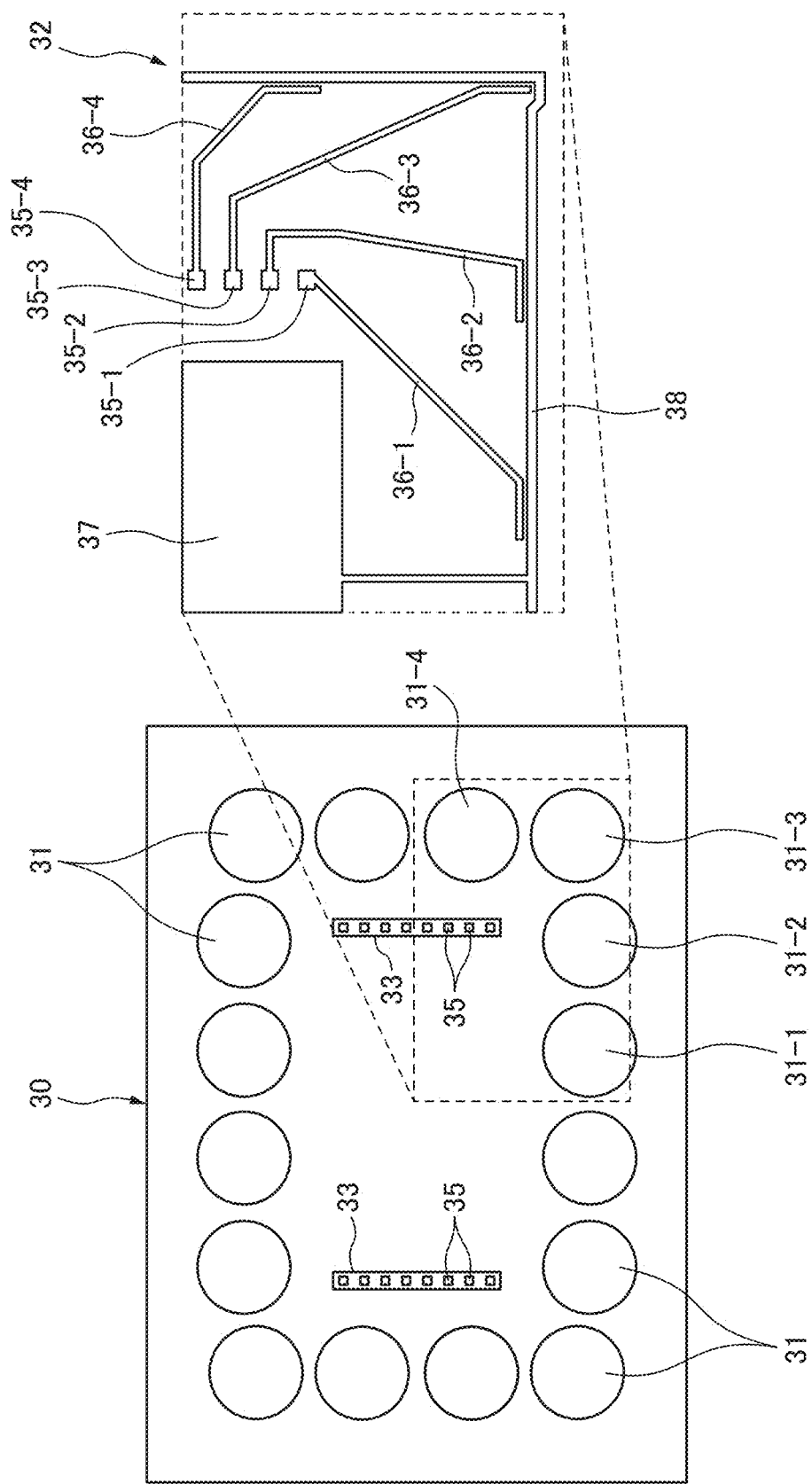
FIG. 6 is a plan view showing a board of an input device.

Referring to FIGS. 1, 2, and 6, the board 30 will be explained. FIG. 6 is a plan view showing the board 30 of the input device 20. In particular, FIG. 6 shows a plan view of the board 30 in the state where the sockets 40 are detached and shows the configuration of an electroconductive member 32 embedded in the board 30, regarding a partial region of the board 30.

As shown in FIGS. 1 and 6, the board 30 is formed into a rectangular shape and has a first surface (front surface), and a second surface (rear surface) formed at the opposite side from the first surface. The board 30 is configured so that the electronic apparatus 10 is placed at the center of its first surface. In particular, in the present embodiment, the electronic apparatus 10 is placed so that the long sides of the display screen of the rectangular shaped touch screen 12 of the electronic apparatus 10 become parallel to the long sides of the rectangular shaped board 30. The board 30 has a plurality of operating parts 31 able to be operated by the user, an electroconductive member 32 embedded in the board 30, and terminal-use openings 33.

The operating parts 31 are operated by the user and, for example, include buttons, switches, or the like. In the example shown in FIGS. 1 and 6, the operating parts 31 are formed as circular push buttons. However, the operating parts 31 may be buttons or switches having other shapes such as rectangular shape, oval shape, cross shape, or the like.

As shown in FIGS. 1 and 6, in the present embodiment, a plurality of operating parts 31 are provided on the first surface on which the electronic apparatus 10 is placed. Therefore, it becomes possible for multiple users to operate the operating parts 31 around a single board 30 while viewing the display screen of the touch screen 12 of the electronic apparatus 10.

Further, in the present embodiment, the board 30 is provided with 16 operating parts 31 from the first operating part 31-1 to the $16^{th}$ operating part 31-16. In the present embodiment, these plurality of operating parts 31 are arranged so as to surround the four sides of the electronic apparatus 10 (entire circumference) when viewed in a direction perpendicular to the display screen of the touch screen 12 in the state where the input device 20 is attached to the electronic apparatus 10 (state of FIG. 1) (below, simply referred to as "when viewed in a direction perpendicular to the display screen at the time of attachment of the input device 20")

In particular, in the present embodiment, the first operating part 31-1 to third operating part 31-3 and the $14^{th}$ operating part 31-14 to the $16^{th}$ operating part 31-16 are arranged along one side (first side) among the two long sides of the display screen of the touch screen 12. Further, the sixth operating part 31-6 to the $11^{th}$ operating part 31-11 are arranged along the long side (second side) facing the first side of the display screen of the touch screen 12. In addition, the third operating part 31-3 to sixth operating part 31-6 are arranged along one side (third side) among the two short sides of the display screen of the touch screen 12. Further, the $11^{th}$ operating part 31-11 to the $14^{th}$ operating part 31-14 are arranged along the short side (fourth side) facing the third side of the display screen of the touch screen 12.

Therefore, in the present embodiment, the operating parts 31 include the first set of operating parts (first operating part 31-1, second operating part 31-2, $15^{th}$ operating part 31-15, $16^{th}$ operating part 31-16, and seventh operating part 31-7 to $10^{th}$ operating part 31-10) arranged so as to straddle the first side and second side of the display screen of the touch screen 12 when viewed in a direction perpendicular to the display screen at the time of attachment of the input device 20. In addition, the operating parts 31 include the second set of operating parts (fourth operating part 31-4 and fifth operating part 31-5 and the $12^{th}$ operating part 31-12 and $13^{th}$ operating part 31-13) arranged so as to straddle the third side and fourth side of the display screen of the touch screen 12 when viewed in a direction perpendicular to the display screen at the time of attachment of the input device 20. By the operating parts 31 being arranged so as to surround the four sides of the electronic apparatus 10 in this way, multiple users can surround the electronic apparatus 10 at its four sides and respectively operate the operating parts 31, and therefore new user experiences can be provided.

Further, in the present embodiment, the operating parts 31 are arranged so as to surround the sockets 40 from the three sides when viewed in a direction perpendicular to the display screen at the time of attachment of the input device 20. In the example shown in FIG. 1, the right side socket 40 is surrounded at its three sides by the first operating part 31-1 to the eighth operating part 31-8, while the left side socket 40 is surrounded at its three sides by the ninth operating part 31-9 to the 16$^{th}$ operating part 31-16. Since the operating parts 31 are arranged so as to surround the sockets 40, the sockets 40 are not positioned between the users and the operating parts 31, and therefore the users become able to operate the operating parts 31 without being obstructed by the sockets 40.

In addition, in the present embodiment, when the display screen of the touch screen 12 is used as a reference, the four operating parts 31 of the first operating part 31-1, second operating part 31-2, 15$^{th}$ operating part 31-15, and 16$^{th}$ operating part 31-16 are arranged at the outside of the first side of the display screen (these four operating parts 31 are arranged so as to be at least partially superposed with the first side when viewing the paper surface of FIG. 1 in the top-down direction). Similarly, the four operating parts 31 of the seventh operating part 31-7 to the 10$^{th}$ operating part 31-10 are arranged at the outside of the second side of the display screen (these four operating parts 31 are arranged so as to be at least partially superposed with the second side when viewing the paper surface of FIG. 1 in the top-down direction). Therefore, when the display screen of the touch screen 12 is used as a reference, the same numbers of operating parts 31 are arranged at the outside of each of the long sides of this display screen. In addition, in the present embodiment, when the display screen of the touch screen 12 is used as a reference, the two operating parts 31 of the fourth operating part 31-4 and fifth operating part 31-5 are arranged at the outside of the third side of the display screen (these two operating parts 31 are arranged so as to be at least partially superposed with the third side when viewing the paper surface of FIG. 1 in the top-down direction). Similarly, the two operating parts 31 of the 12th operating part 31-12 and 13th operating part 31-13 are arranged at the outside of the fourth side of the display screen (these two operating parts 31 are arranged so as to be at least partially superposed with the fourth side when viewing the paper surface of FIG. 1 in the top-down direction). Therefore, when the display screen of the touch screen 12 is used as a reference, the same numbers of operating parts 31 are arranged at the outside of each of the short sides of the display screen. As a result, the users positioned at the long sides of the touch screen 12 can operate the same numbers of operating parts 31, while the users positioned at the short sides of the touch screen 12 can operate the same numbers of operating parts 31. Therefore, at least the users positioned so as to face each other can input similar operations, and therefore a new user experience can be provided.

The electroconductive member 32 is embedded in the board 30 and accordingly is basically arranged between the first surface and second surface of the board 30. As shown in FIG. 6, the electroconductive member 32 has a plurality of board side terminals 35, terminal side wirings 36 connected to the board side terminals 35, a metal sheet member 37, and a ground side wiring 38 connected to the metal sheet member 37.

In the present embodiment, the electroconductive member 32 has the same numbers of board side terminals 35 and terminal side wirings 36 as the number of operating parts 31. Therefore, in the present embodiment, the electroconductive member 32 has 16 board side terminals 35 from the first board side terminal 35-1 to the 16$^{th}$ board side terminal 35-16 (not shown), and 16 terminal side wirings 36 from the first terminal side wiring 36-1 to the 16$^{th}$ terminal side wiring 36-16 (not shown). Further, the plurality of board side terminals 35 are connected to the corresponding operating parts 31 through terminal side wirings 36. For example, the first board side terminal 35-1 is connected to the first operating part 31-1 through the first terminal side wiring 36-1. In particular, in the present embodiment, the first board side terminal 35-1 to the eighth board side terminal 35-8 (not shown) are arranged aligned at the right side of the board 30, while the ninth board side terminal 35-9 to the 16$^{th}$ board side terminal 35-16 are arranged aligned at the left side of the board 30. The board side terminals 35 at the right side of the board 30 are connected through the terminal side wirings 36 to operating parts 31 arranged at the right side among the operating parts 31 arranged along the long sides of the display screen of the touch screen 12 (first side and second side) and to operating parts 31 arranged along the short side at the right side of the display screen of the touch screen 12 (one of the third side and fourth side). On the other hand, the board side terminals 35 at the left side of the board 30 are connected through the terminal side wirings 36 to operating parts 31 arranged at the left side among the operating parts 31 arranged along the long sides of the display screen of the touch screen 12 (first side and second side) and to operating parts 31 arranged along the short side at the left side of the display screen of the touch screen 12 (the other of the third side and fourth side).

In particular, in the present embodiment, the center board side terminals 35 among the board side terminals 35 arranged aligned at the right side (or left side) of the board 30 are connected to the operating parts 31 arranged along the short side (one of third side and fourth side) at the right side (or left side) of the display screen of the touch screen 12. On the other hand, the board side terminals 35 at both end sides (in FIG. 6, top side and bottom side) among the board side terminals 35 arranged aligned at the right side (or left side) of the board 30 are connected to the operating parts 31 arranged at the right side (or left side) among the operating parts 31 arranged along the long sides of the display screen of the touch screen 12 (first side and second side). As a result, the terminal side wirings 36 between the board side terminals 35 and the operating parts 31 will no longer intersect and the electroconductive member 32 can be made a simpler structure.

On the other hand, the metal sheet 37 is arranged so as to extend completely over the region at which the electronic apparatus 10 is placed. Therefore, the metal sheet 37 is provided at a position superposed with the entire electronic apparatus 10 when viewed in a direction perpendicular to the display screen at the time of attachment of the input device 20. Note that, the metal sheet 37 need not be superposed with the electronic apparatus 10 as a whole as long as at least partially being superposed with the electronic apparatus 10 when viewed in a direction perpendicular to the display screen at the time of attachment of the input device 20. Specifically, it need not be superposed with the entire electronic apparatus 10 as long as at least partially being superposed with the ground electrode arranged at the inside of the electronic apparatus 10. As a result, when the input device 20 is attached to the electronic apparatus 10, a large electrostatic capacitance is formed between the metal sheet 37 and the ground electrode of the electronic apparatus 10 and accordingly the potential of the metal sheet 37 can be made substantially the same potential as the ground electrode of the electronic apparatus 10. The metal sheet 37 is connected to all of the operating parts 31 through the ground side wiring 38. Note that, instead of the metal sheet 37 or in addition to the metal sheet 37, the ground side wiring 38 may be configured to be able to be connected with a ground electrode of the electronic apparatus 10. The potential of the ground side wiring 38 can be made the same potential as the potential of the ground electrode of the electronic apparatus 10.

Therefore, the operating parts 31 are connected to the corresponding board side terminals 35 through the terminal side wirings 36 and are connected to the metal sheet 37 through the ground side wiring 38. In the present embodiment, the operating parts 31 are rendered a state where the terminal side wirings 36 connected to the operating parts 31, and the ground side wiring 38 are electrically disconnected when the operating parts 31 are not being pushed by the user. On the other hand, the operating parts 31 are rendered a state where the terminal side wirings 36 connected to the operating parts 31, and the ground side wiring 38 are electrically connected when the operating parts 31 are being pushed by the user. As a result, the potentials of the board side terminals 35 corresponding to the operating parts 31 change due to operation of the operating parts 31 by the user.

The terminal-use openings 33 are openings provided at the first surface side of the board 30. Inside the terminal-use openings 33, a plurality of board side terminals 35 are arranged. Due to the terminal-use openings 33, the board side terminals 35 are exposed to the outside of the board 30. In the present embodiment, two terminal-use openings 33 are provided in the board 30. Inside each terminal-use opening 33, eight board side terminals 35 are arranged.

Note that, in the present embodiment, the metal sheet 37 is covered, but the metal sheet 37 may also be arranged so that it is exposed on the first surface of the board 30.

Further, in the present embodiment, the board 30 is formed to be able to be bent. For example, the board 30, as shown in FIG. 1, is formed so as to be able to be folded into two at the folding line X. In particular, in the present embodiment, the folding line X extends through the center of the board 30, and therefore the operating parts 31 are arranged line symmetrically about the folding line X. Further, if forming the board 30 so as to be able to be folded into two about the predetermined folding line X, the electroconductive member 32 may also be formed divided into two at both sides of the folding line. In this case, metal sheets 37 are respectively provided at the regions at both sides of the folding line and are connected to the operating parts 31 and board side terminals 35 arranged in the corresponding regions. By enabling the board 30 to bend in this way, the board 30 can be easily carried.

Note that, in the present embodiment, one board side terminal 35 is connected to one operating part 31. However, a plurality of board side terminals 35 may also be connected to one operating part 31. For example, if the operating part 31 is a cross button, four board side terminals 35 may be connected to one operating part 31.

Further, in the present embodiment, at the board 30, 16 operating parts 31 and their corresponding 16 board side terminals 35 and terminal side wirings 36 are provided. However, at the board 30, another number of operating parts 31 or the like may be provided. In this case, the shapes of the sockets 40 are left as they are while the arrangements of the operating parts 31 and board side terminals 35 and the shapes of the terminal side wirings 36 are changed.

In addition, in the present embodiment, the board 30 is formed as a rigid plate-shaped member. However, the board 30 may also, for example, be formed as a sheet-shaped member with flexibility.

Socket

Figure 7:
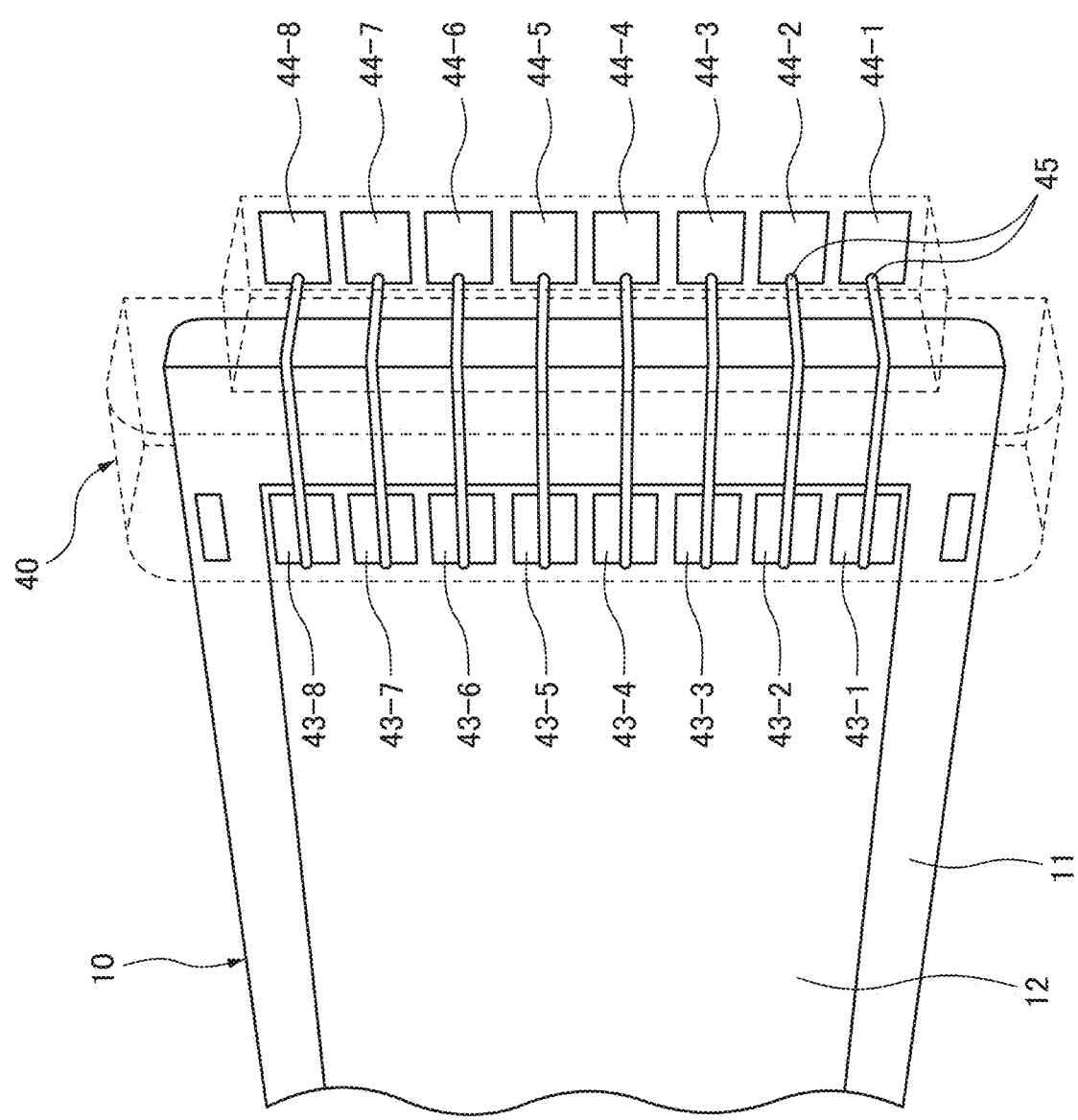
FIG. 7 is a perspective view of a socket and electronic apparatus in the state with the socket attached to the electronic apparatus.

Next, referring to FIGS. 1, 2, and 7, the sockets 40 will be explained. FIG. 7 is a perspective view of a socket 40 and electronic apparatus 10 in the state where the socket 40 is attached to the electronic apparatus 10. In particular, in FIG. 7, the body of the socket 40 is shown in a transparent state by broken lines.

A socket 40 is an example of a fastener configured to fasten the input device 20 to the electronic apparatus 10 in a detachable manner. A socket 40 is formed by a nontransparent and nonconductive material. The socket 40 has a recessed part 42, a plurality of electrodes 43, a plurality of socket side terminals 44, and socket wirings 45 connected to the electrodes 43 and socket side terminals 44. Therefore, the socket 40 performs the two functions of fastening the input device 20 with respect to the electronic apparatus 10 while holding the electrodes 43. Due to this, the number of parts of the input device 20 becomes smaller.

The recessed part 42 has a shape complementary with a side part of the electronic apparatus 10. In particular, in the present embodiment, the recessed part 42 has a shape complementary with a side part of the electronic apparatus 10 at a short side of the touch screen 12. Therefore, the recessed part 42 is formed so as to enable the side part of the electronic apparatus 10 to be fit into the recessed part 42. In particular, the recessed part 42, as shown in FIGS. 1 and 7, is formed so that the socket 40 covers a part of the region at the short side of the touch screen 12 when the side part of the electronic apparatus 10 is fit into it. In the present embodiment, the input device 20 has two sockets 40. Into each socket 40, one of the two facing side parts of the electronic apparatus 10 is fit.

Further, as explained above, a socket 40 is fastened to the board 30 in a detachable manner. Therefore, the input device 20 is fastened to the electronic apparatus 10 by the socket 40 being fastened to the board 30 in the state with the electronic apparatus 10 fit in the socket 40. Therefore, the socket 40 fastens the input device 20 to the electronic apparatus 10 in a detachable manner.

The plurality of electrodes 43 are arranged so as to be positioned on the touch screen 12, in particular on the touch panel 14 of the touch screen 12, when the side part of the electronic apparatus 10 is fit in the socket 40 and the socket 40 is attached to the electronic apparatus 10. In particular, in the present embodiment, the electrodes 43 are arranged in the socket 40 so as to contact the touch panel 14. However, the electrodes 43 may also be arranged so as not to contact the touch panel 14. However, they are arranged so that even in this case, when the electrostatic capacitance between an electrode 43 and corresponding region of the touch panel 14 changes due to an operating part 31 corresponding to the electrode 43 being operated and the potential of the electrode 43 changing, the change in the electrostatic capacitance can be sufficiently detected by the touch panel 14. Further, the electrodes 43 may also be arranged on the surfaces of the sockets 40.

Further, the surface of the touch screen 12 where the plurality of electrodes 43 are arranged is covered by the nontransparent socket 40, when the socket 40 is attached to the electronic apparatus 10. In other words, the socket 40 functions as a nontransparent covering part covering the surface of the touch screen 12 where the plurality of electrodes 43 are arranged. By the electrodes 43 being covered by the socket 40 in this way, the user can be prevented from touching the electrodes 43. Further, by the surface of the touch screen 12 where the electrodes 43 are arranged being covered by the socket 40, the user can concentrate more on the screen displayed at the touch screen 12 not covered by the socket 40. Further, the socket 40 is formed by a non-conductive material, therefore by the electrodes 43 being covered by the socket 40, the electrostatic capacitance between an electrode 43 and the touch panel 14 is kept from changing due to the hand of the user or other external factor.

The plurality of electrodes 43 are arranged at different positions of the touch panel 14. In the present embodiment, as shown in FIG. 7, the plurality of electrodes 43 are arranged aligned along a short side of the display screen of the touch screen 12 on the touch panel 14. In particular, in the present embodiment, the plurality of electrodes 43 are arranged aligned in a single row along a short side of the display screen of the touch screen 12, in particular, adjacent to the short side. However, the plurality of electrodes 43 may also be arranged aligned in multiple rows along a short side of the display screen. Further, the plurality of electrodes 43 are arranged at the socket 40 so as to be positioned on the touch panel 14 at a region where the socket 40 covers the touch screen 12 when a side part of the electronic apparatus 10 is fit. In particular, in the present embodiment, the electrodes 43 are arranged so that the inside end of the socket 40 (center side of the touch panel 14) is positioned more inside than the inside ends of the electrodes 43. Due to this, the electrodes 43 are no longer exposed to the outside, and therefore some sort of member contacting an electrode 43 from the outside and the potential of the electrode 43 ending up changing is suppressed.

In this regard, if the plurality of electrodes 43 were arranged along a long side of the display screen of the touch screen 12 and the socket 40 was formed to cover the part of the region of the touch screen 12 at the long side, the region of the touch screen 12 which the user could visually confirm would become an elongated shape and the visual confirmation ability of the user would fall. As opposed to this, in the present embodiment, the plurality of electrodes 43 are arranged along a short side of the display screen of the touch screen 12 while the socket 40 is formed so as to cover part of the regions at the short side of the touch screen 12. Therefore, the user recognition ability is kept from decreasing.

In the present embodiment, one socket 40 is provided with eight electrodes 43 of the first electrode 43-1 to the eighth electrode 43-8. The number of electrodes 43 is equal to the number of board side electrodes 35 arranged inside one terminal-use opening 33.

The plurality of electrodes 43 are connected to the respective socket side terminals 44 through the socket wirings 45. In the present embodiment, a socket 40 is provided with eight socket side terminals 44 from the first socket side terminal 44-1 to the eighth socket side terminal 44-8. The socket side terminals 44 are electrically connected to the corresponding board side terminals 35 of the board 30 when the socket 40 is fastened to the board 30. For example, the first socket side terminal 44-1 is connected to the first board side terminal 35-1. As a result, the first electrode 43-1 is connected to the first operating part 31-1 and accordingly can be connected with the metal sheet 37 through the first operating part 31-1. In other words, the metal sheet 37 is formed to be able to connect with a plurality of electrodes 43 in accordance with the operation of the operating part 31.

In the present embodiment, the socket side terminals 44 of the socket 40 fastened to the right side of the board 30 are connected to the board side terminals 35 at the right side of the board 30. Therefore, the plurality of electrodes 43 arranged aligned along the short side at the right side of the display screen of the touch screen 12 are connected to the operating parts 31 arranged at the right side among the operating parts 31 arranged along the long sides (first side and second side) of the display screen of the touch screen 12 and the operating parts 31 arranged along the short side at the right side of the display screen of the touch screen 12 (one of third side and fourth side). On the other hand, the socket side terminals 44 of the socket 40 fastened to the left side of the board 30 are connected to the board side terminals 35 at the left side of the board 30. Therefore, the plurality of electrodes 43 arranged aligned along the short side at the left side of the display screen of the touch screen 12 are connected to the operating parts 31 arranged at the left side among the operating parts 31 arranged along the long sides of the display screen of the touch screen 12 (first side and second side) and the operating parts 31 arranged along the short side at the left side of the display screen of the touch screen 12 (the other of the third side and fourth side).

In the thus configured input device 20, if an operating part 31 is operated by the user, the potential of the electrode 43 corresponding to the operating part 31 changes. In other words, in the input device 20, the electrodes 43 are connected to the operating parts 31 so that their potentials change in accordance with the states of operation of the operating parts 31 corresponding to the electrodes 43. In particular, in the present embodiment, if an operating part 31 is pushed by the user, the potential of the electrode 43 corresponding to the operating part 31 becomes a potential substantially the same as the ground electrode of the electronic apparatus 10. If the potential of an electrode 43 changes in this way, the electrostatic capacitance between the electrode 43 and the region on the touch panel 14 corresponding to the electrode 43 changes. The change in the electrostatic capacitance is detected by a sensor electrode of the touch panel 14. Therefore, the touch panel 14 detects a value of a parameter (including a current value detected by the above-mentioned reception side sensor electrodes, or the like) relating to the electrostatic capacitance formed between the touch panel 14 corresponding to an electrode 43 and the electrode 43 and changing in accordance with a change in the potential of the electrode 43.

Specifically, for example, if the user pushes the first operating part 31-1, the potential of the first electrode 43-1 connected to the first operating part 31-1 through the first terminal side wiring 36-1, first board side terminal 35-1, first socket side terminal 44-1, and socket wiring 45 changes. If the potential of the first electrode 43-1 changes, at the region of the touch panel 14 corresponding to the first electrode 43-1, specifically, for example, the four sections positioned at the intersections of the R21 row, R22 row and the C37 column, C38 column, the electrostatic capacitance between the first electrode 43-1 and these sections changes and the change in the electrostatic capacitance is detected by the sensor electrodes corresponding to these sections. Therefore, in the present embodiment, an operation at the operating part 13 by the user can be detected by the touch panel 14.

Note that, in the present embodiment, one electrode 43 is connected with one operating part 31. However, one electrode 43 may also be connected with a plurality of operating parts 31, and one operating part 31 may also be connected with a plurality of electrodes 43.

Further, in the present embodiment, each socket 40 is provided with eight electrodes 43. As a result, the touch panel 14 may have a total of 16 electrodes 43 arranged along the short sides of the touch panel 14. However, the touch panel 14 can also have any number of electrodes 43 equal to or greater than 1, arranged at any positions on the touch panel 14.

Summary of Technique for Detecting Operation at Operating Part Using Touch Panel Next, the technique for detecting operation at an operating part 31 by the touch panel 14 will be explained in summary.

An operation at an operating part 31 is detected by the detection part 181 of the processor 18 based on the electrostatic capacitance detected by the touch panel 14. In the present embodiment, the detection part 181 acquires a first electrostatic capacitance expressed by the electrostatic capacitance detected by the touch panel 14 (or the value of another parameter relating to the electrostatic capacitance) when no operating part 31 is being operated by the user in the state where the input device 20 is attached to the electronic apparatus 10. In addition, the detection part 181 acquires a second electrostatic capacitance expressed by the electrostatic capacitance detected by the touch panel 14 (or the value of another parameter relating to the electrostatic capacitance) at any timing after the first electrostatic capacitance is detected in the state where the input device 20 is attached to the electronic apparatus 10. Further, an operation at an operating part 31 by the user at a timing at which the second electrostatic capacitance is detected is detected based on the thus acquired values of the first electrostatic capacitance and the second electrostatic capacitance.

In particular, in the present embodiment, if the input device 20 is attached to the electronic apparatus 10, the plurality of electrodes 43 are arranged at different positions of the touch panel 14. If one electrode 43 is arranged on the touch panel 14, due to this, the electrostatic capacitance detected at the region corresponding to the electrode 43 (corresponding section) at the touch panel 14 changes. The first electrostatic capacitance which is the electrostatic capacitance detected at the entire surface of the touch panel 14 at this time becomes the combination of the electrostatic capacitances generated at the corresponding regions of the touch panel 14 along with the electrodes 43 being arranged on the touch panel 14.

Further, if an operating part 31 corresponding to one electrode 43 is operated and the potential at that electrode 43 changes, due to this, the electrostatic capacitance detected at the region corresponding to the electrode 43 (corresponding section) changes. The second electrostatic capacitance which is the electrostatic capacitance detected at the entire surface of the touch panel 14 at this time becomes the combination of the electrostatic capacitances generated at the corresponding regions of the touch panel 14 along with the potentials of the electrodes 43 arranged on the touch panel 14.

Therefore, in the present embodiment, the detection part 181 detects an operation at an operating part 31 by the user based on the electrostatic capacitance corresponding to each electrode 43 in the first electrostatic capacitance (electrostatic capacitance generated at a corresponding region of the touch panel 14 along with an electrode 43 being arranged on the touch panel 14) and the electrostatic capacitance of the electrode 43 in the second electrostatic capacitance (electrostatic capacitance generated at a corresponding region of the touch panel 14 along with the potential of an electrode 43 arranged on the touch panel 14).

In this regard, the electrostatic capacitance detected by the touch panel 14 changes when the input device 20 is attached to the electronic apparatus 10. In particular, even if an operating part 31 is not operated by the user and accordingly the electrode 43 corresponding to the operating part 31 is not connected to the metal sheet 37 of substantially the same potential as the ground electrode of the electronic apparatus 10, the electrostatic capacitance detected at the section of the touch panel 14 facing the electrode 43 becomes greater. Further, if an operating part 31 is operated by the user, the detected electrostatic capacitance further changes from that state. According to the present embodiment, since an operation at an operating part 31 by the user is detected based on not only the electrostatic capacitance detected at the touch panel 14 at any timing (corresponding to the second electrostatic capacitance), but also the first electrostatic capacitance when no operating part 31 is being operated, even if the input device 20 is attached to the electronic apparatus 10 and the electrostatic capacitance detected at the touch panel 14 changes, it is possible to precisely detect an operation at the operating part 31 by the user. Therefore, according to the present embodiment, it is possible to raise the decision precision of input from the input device 20 to the touch panel 14.

Further, in the present embodiment, for each of the plurality of electrodes 43, operation at an operating part 31 corresponding to that electrode 43 is detected based on the corresponding electrostatic capacitance in the first electrostatic capacitance and the corresponding electrostatic capacitance in the second electrostatic capacitance. Therefore, it is possible to precisely detect an operation at an operating part 31 corresponding to each electrode.

The technique for detection of an operation of an operating part 31 at the detection part 181 according to one embodiment will be explained in detail below.

Distribution Model

In the present embodiment, the detection part 181 generates a mathematical distribution model relating to the distribution of the first electrostatic capacitance based on the first electrostatic capacitance, and detects an operation at an operating part 31 by the user based on the generated mathematical distribution model and second electrostatic capacitance. As shown in FIG. 5, the detection part 181 has a model generation part 181a for generating a mathematical distribution model relating to the distribution of the first electrostatic capacitance based on the first electrostatic capacitance, and a model usage detection part 181b detecting operation at an operating part 31 by the user based on the generated mathematical distribution model and second electrostatic capacitance. Below, referring to FIGS. 8A to 9, the mathematical distribution model for expressing the distribution of the first electrostatic capacitance will be explained.

Figure 8A:
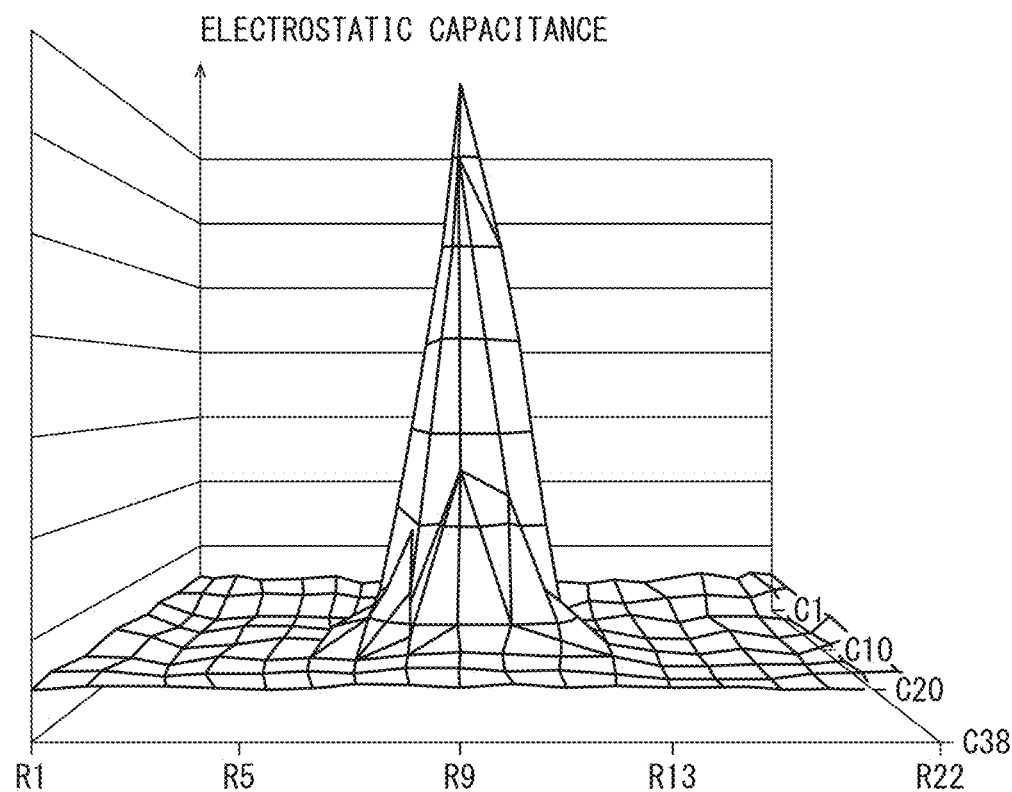
FIG. 8A is a view showing a distribution of electrostatic capacitance detected by a touch panel when a finger of a person contacts the touch panel.
Figure 8B:
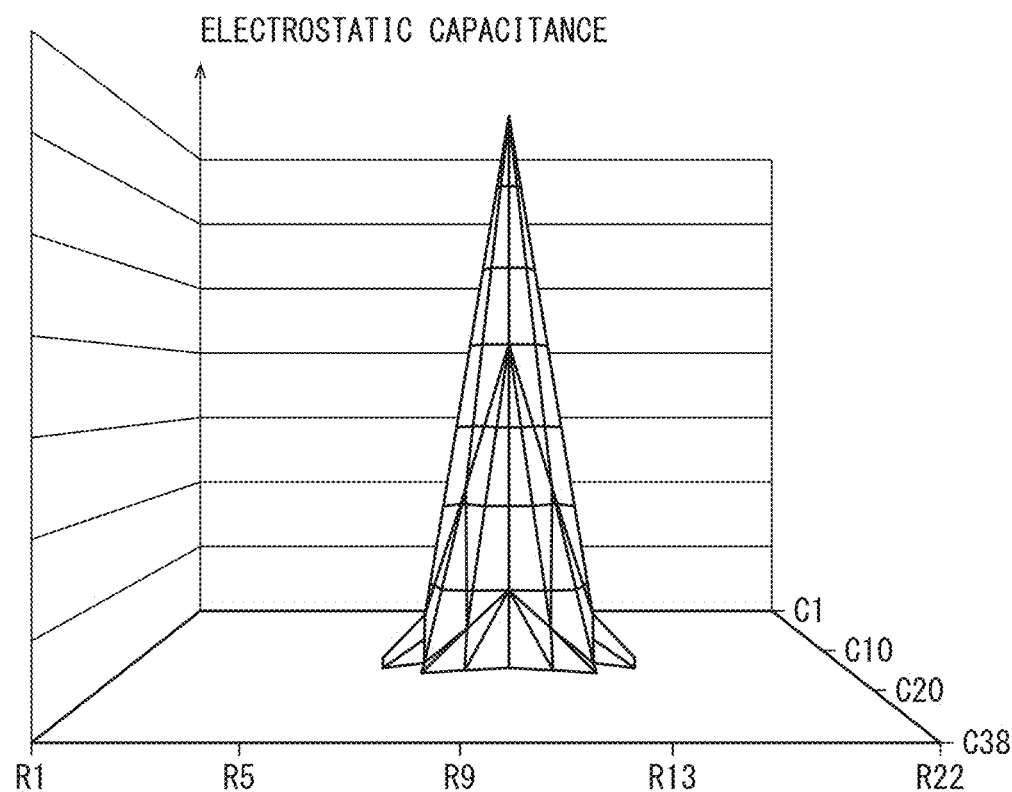
FIG. 8B is a view showing, by a distribution similar to FIG. 8A, a 2D normal distribution obtained by suitably adjusting an average value and dispersion so as to match the distribution of FIG. 8A.

FIG. 8A is a view showing the distribution of electrostatic capacitance detected by the touch panel 14 when the finger of a person touches the touch panel 14. The abscissa in FIG. 8A shows the short sides of the touch panel 14, the axis extending in the depth direction shows the long sides of the touch panel 14, and the ordinate shows the electrostatic capacitance detected at the different sections of the touch panel 14. On the other hand, FIG. 8B is a view showing a 2D normal distribution obtained by suitably adjusting the average value and dispersion so as to match the distribution of FIG. 8A, by a distribution similar to FIG. 8A. From FIGS. 8A and 8B, it will be understood that the distribution of electrostatic capacitance detected by the touch panel 14 when an object touches the touch panel 14 or an object approaches it can be approximated by a 2D normal distribution. Therefore, the distribution of electrostatic capacitance detected by an electrode 43 being arranged on the touch panel 14 can be approximated by a 2D normal distribution.

Further, for example, if the surface area of an electrode 43 facing the touch panel 14 is large, the distribution of electrostatic capacitance detected by the touch panel 14 will not necessarily be able to be approximated by a single 2D normal distribution. However, in such a case as well, the distribution of electrostatic capacitance detected by the touch panel 14 can be approximated by a combination of a plurality of 2D normal distributions. Therefore, the distribution of electrostatic capacitance detected by a touch panel 14 due to the effect of one electrode 43 on the touch panel 14 (below, also referred to as "distribution of electrostatic capacitance corresponding to an electrode") can be approximated by a mixed normal distribution model (GMM) such as in the following formula (3).

$$G^{(s)}(x, y) = \sum_m \sum_n \frac{\omega^{(s)} u_m v_n}{2\pi \sigma^{(x)} \sigma^{(y)}} \exp\left(-\frac{(x - \tau^{(x)} - m\sigma^{(x)})^2}{2\sigma^{(x)2}} - \frac{(y - \tau^{(y)} - m\sigma^{(y)})^2}{2\sigma^{(y)2}}\right) \quad (3)$$

In formula (3), $G^{(S)}(x,y)$ shows the electrostatic capacitance at coordinates $(x,y)$ of the touch panel 14. Here, the x-direction of the touch panel 14 indicates for example the long side direction of the touch panel 14, while the y-direction indicates for example the short side direction of the touch panel 14. Further, in formula (3), "m" is an index of normal distribution in the x-direction when expressing the distribution of electrostatic capacitance corresponding to one electrode 43 by a mixed normal distribution model. The index "m" satisfies $1 \le m \le M$, while M is a constant changing in accordance with the size of the electrode 43 or the like. For example, if approximating the distribution of electrostatic capacitance corresponding to one electrode 43 by combination of three normal distributions in the x-direction, M=3 and accordingly m=1, 2, 3. Similarly, "n" is an index of normal distribution in the y-direction when expressing the distribution of electrostatic capacitance corresponding to one electrode 43 by a mixed normal distribution model. The index "n" satisfies $1 \le n \le N$, while N, like M, is a constant changing in accordance with the size of the electrode 43 or the like.

Figure 9:
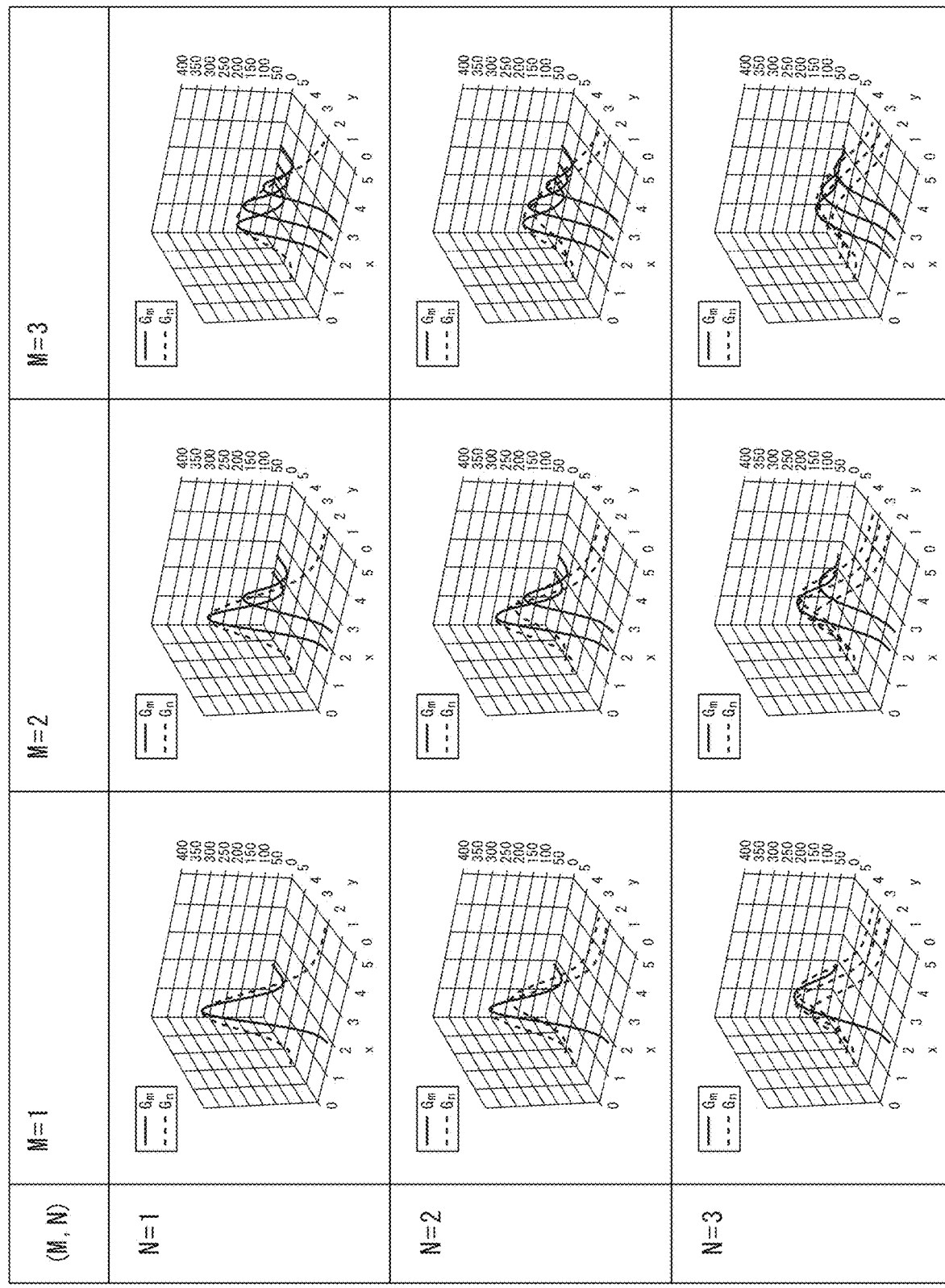
FIG. 9 is a view schematically showing a mixed normal distribution model when M, N are respective values.

FIG. 9 is a view schematically showing a mixed normal distribution model when M and N are respectively values. Both may be 1 (M=1, N=1). In this case, as will be understood from FIG. 9, the distribution of electrostatic capacitance corresponding to one electrode 43 is expressed by only one normal distribution. On the other hand, if M=3, N=3, the distribution of electrostatic capacitance corresponding to one electrode 43 is expressed as a combination of a total of nine normal distributions of three in the x-direction and three in the y-direction.

Further, in formula (3), $\omega^{(s)}$ expresses a strength of electrostatic capacitance and becomes a large value when the distribution of electrostatic capacitance corresponding to one electrode 43 is large overall. $u_m$ expresses the relative strength of the m-th normal distribution in the M number of normal distributions in the x-direction and satisfies $\Sigma_m u_m = 1$. Therefore, if M=1, $u_1$ is 1. Further, $v_m$ shows the relative strength of the n-th normal distribution in the N number of normal distributions in the y-direction and satisfies $\Sigma_n v_n = 1$. Therefore, if N=1, $v_1$ is 1.

Furthermore, in formula (3), $\sigma^{(x)}$ indicates the dispersion in the x-direction of the normal distributions included in the mixed normal distribution model. In the present embodiment, the dispersion in the x-direction of all normal distributions included in the mixed normal distribution model is approximated as the same value, but it may also be approximated as having a different value for each normal distribution. Further, $\sigma^{(y)}$ shows the dispersion in the y-direction of the normal distributions included in the mixed normal distribution model. In the present embodiment, the dispersion in the y-direction of the normal distributions included in the mixed normal distribution model is approximated as the same value, but it may also be approximated as having a different value for each normal distribution.

Further, in formula (3), $\tau^{(x)}$ expresses the position in the x-coordinates of the $1^{st}$ normal distribution among the M number of normal distributions in the x-direction. Note that, in the present embodiment, the M number of normal distributions in the x-direction are approximated as being separated by exactly the dispersion $\sigma^{(x)}$ in the x-direction. Therefore, the position in the x-coordinates of the m-th normal distribution in the x-direction is expressed by $\tau^{(x)} + (m-1)\sigma^{(x)}$. Similarly, $\tau^{(y)}$ expresses the position in the y-coordinates of the $1^{st}$ normal distribution among the N number of normal distributions in the y-direction. Note that, in the present embodiment, the N number of normal distributions in the y-direction are approximated as being separated by exactly the dispersion $\sigma^{(y)}$ in the y-direction.

Further, in the present embodiment, when the input device 20 is attached to the electronic apparatus 10, K number of electrodes 43 are arranged on the touch panel 14 (in the present embodiment, K=16). Therefore, the distribution of electrostatic capacitance corresponding to all of the electrodes 43 arranged on the touch panel 14 can be approximated by a mixed normal distribution model expressed by the following formulas (4), (5) obtained by combining the distribution of electrostatic capacitance corresponding to one electrode 43 expressed by the above formula (3) for the number of electrodes 43.

$$G^{(s)}(x, y) = \sum_k \sum_m \sum_n \omega_k^{(s)} G_{kmn}^{(s)}(x, y) \quad (4)$$

$$G_{kmn}^{(s)}(x, y) = \frac{u_{k,m} v_{k,n}}{2\pi \sigma^{(x)} \sigma^{(y)}} \exp\left(-\frac{(x - \tau_k^{(x)} - m\sigma^{(x)})^2}{2\sigma^{(x)2}} - \frac{(y - \tau_k^{(y)} - m\sigma^{(y)})^2}{2\sigma^{(y)2}}\right) \quad (5)$$

Note that, in formulas (4), (5), "k" indicates an index of an electrode 43 when a plurality of electrodes 43 are arranged on the touch panel 14. The index "k" satisfies $1 \le k \le K$. In the present embodiment, K=16, and therefore "k" is a whole number of 1 to 16.

Therefore, the mixed normal distribution model approximating the distribution of electrostatic capacitance of the touch panel 14 as a whole expressed by formulas (4), (5) can be said to be expressed as a set of partial normal distribution models for the electrodes 43 expressed by formula (3).

Generation of Mathematical Distribution Model

In the present embodiment, the mathematical distribution model showing the distribution of the electrostatic capacitance is generated by calibrating the values of the various parameters of the mathematical distribution model showing the distribution of electrostatic capacitance corresponding to all of the electrodes 43, based on the distribution of the electrostatic capacitance detected by the touch panel 14 (first electrostatic capacitance) when none of the operating parts 31 are being operated in the state where the input device 20 is attached to the electronic apparatus 10. Specifically, in the present embodiment, the mathematical distribution model is generated by calibrating the values of $\omega_k^{(s)}$, $\tau_k^{(x)}$, $\tau_k^{(y)}$, $\sigma^{(x)}$, $\sigma^{(y)}$, $u_{k,m}$, $v_{k,n}$ and the later explained noise component $G^{(n)}(x,y)$. Below, referring to FIGS. 10 to 12, generation of the mathematical distribution model performed by the model generation part 181a of the processor 18 will be explained.

Figure 10:
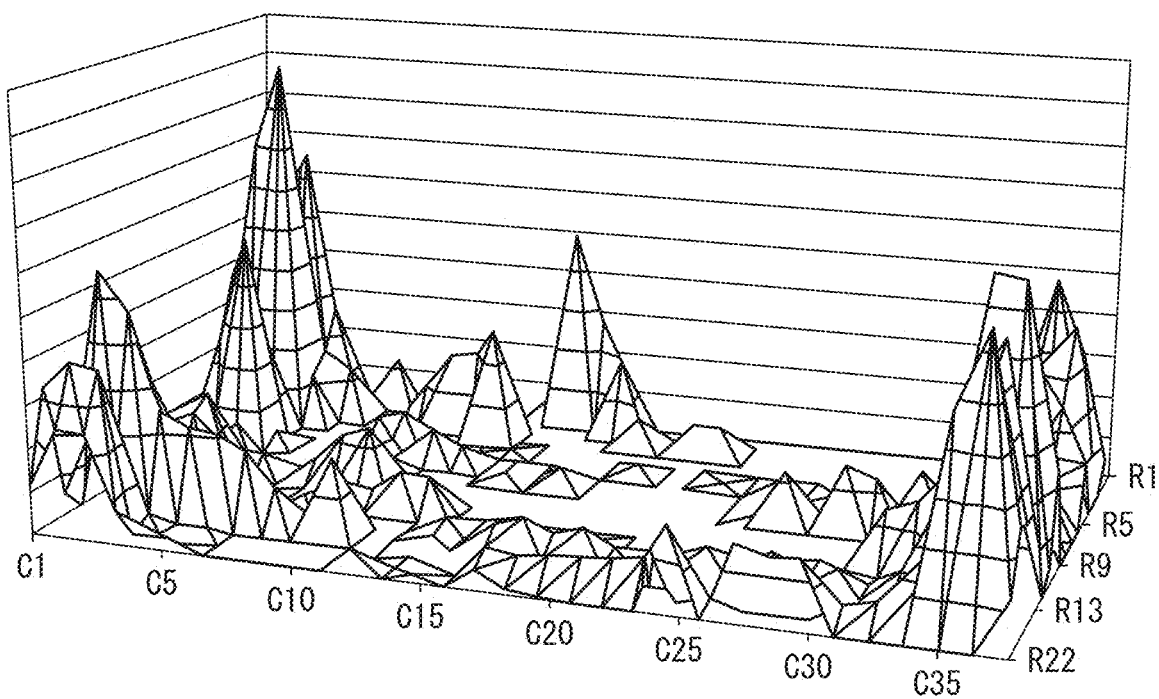
FIG. 10 is a view showing a distribution of electrostatic capacitance detected by the touch panel when none of the operating parts are being operated.

FIG. 10 is a view showing the distribution $C(x,y)$ of the electrostatic capacitance detected by the touch panel 14 when none of the operating parts 31 are being operated in the state where the input device 20 is attached to the electronic apparatus 10. As will be understood from FIG. 10, in the distribution of electrostatic capacitance detected by the touch panel 14, due to the electrodes 43 being positioned on the touch panel 14, the electrostatic capacitance becomes larger at the sections positioned at both sides of the touch panel 14 in the long side direction, but in other regions as well, the electrostatic capacitance changes with each region. This is based on the noise generated regardless of the electrodes 43 positioned on the touch panel 14.

Therefore, in the present embodiment, the distribution of the electrostatic capacitance detected by the touch panel 14, as shown in the following formula (6), is expressed by a mathematical distribution model including the electrostatic capacitance component $G^{(s)}(x,y)$ expressing the distribution of the electrostatic capacitance on the touch panel 14 and the noise component $G^{(n)}(x,y)$. The noise component $G^{(n)}(x,y)$ in formula (6) is, for example, a matrix of X rows and Y columns (therefore, a matrix having the number of sections of rows in the x-direction of the touch panel 14 and the number of sections of columns in the y-direction).

$$G(x, y) = G^{(s)}(x, y) + G^{(n)}(x, y) \quad (6)$$

Figure 11A:
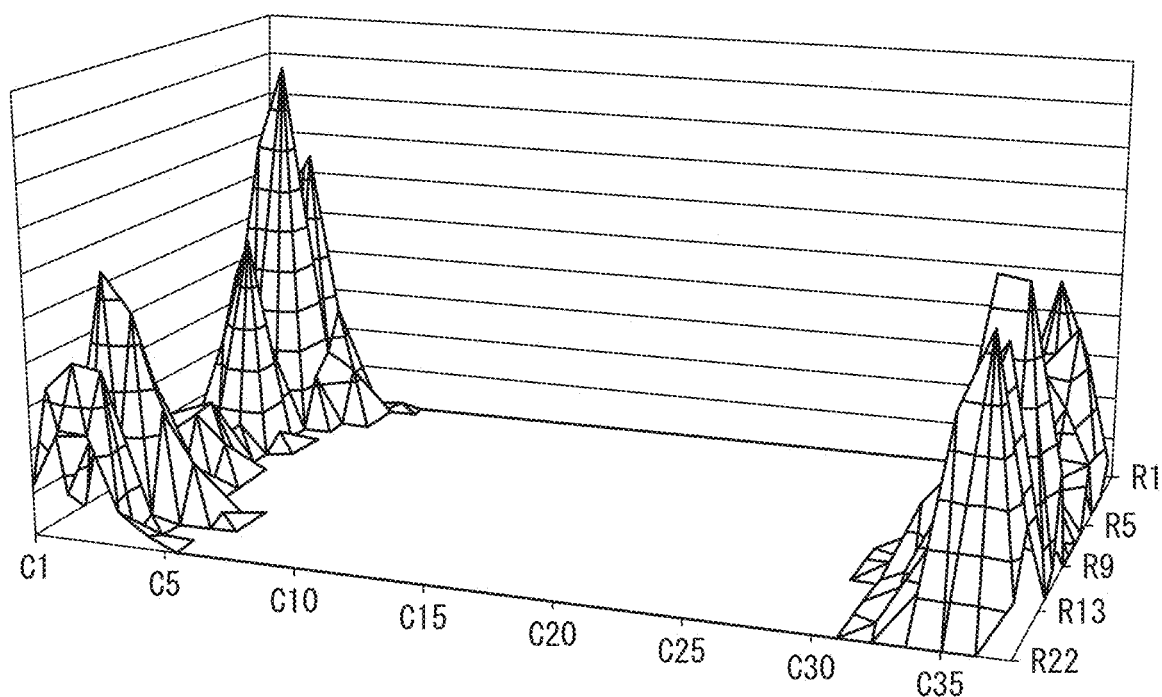
FIG. 11A is a view showing a distribution of electrostatic capacitance when the distribution of electrostatic capacitance is expressed by a mathematical distribution model including an electrostatic capacitance component and noise component.
Figure 11B:
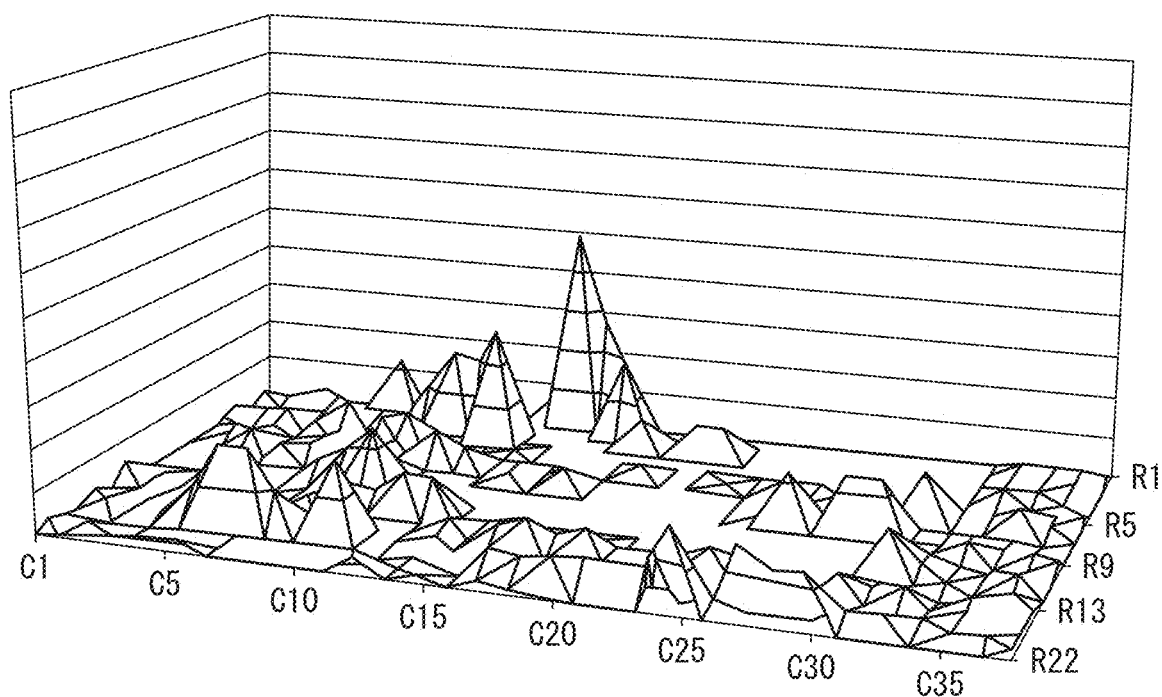
FIG. 11B is a view showing a distribution of a noise component when the distribution of electrostatic capacitance is expressed by a mathematical distribution model including an electrostatic capacitance component and noise component.

FIG. 11A is a view showing the distribution of the electrostatic capacitance component $G^{(s)}(x,y)$ when expressing the distribution of electrostatic capacitance $C(x,y)$ detected by the touch panel 14 such as shown in FIG. 10 by a mathematical distribution model including the electrostatic capacitance component $G^{(s)}(x,y)$ and the noise component $G^{(n)}(x,y)$. On the other hand, FIG. 11B is a view showing the distribution of the noise component at this time. Therefore, the distribution of electrostatic capacitance $C(x,y)$ detected by the touch panel 14 such as shown in FIG. 10 becomes expressed as a combination of the electrostatic capacitance component $G^{(s)}(x,y)$ shown in FIG. 11A and the noise component $G^{(n)}(x,y)$ shown in FIG. 11B.

Further, in the present embodiment, the values of the various parameters included in the mathematical distribution model $G(x,y)$ are calculated so that the distribution of electrostatic capacitance expressed by the mathematical distribution model $G(x,y)$ expressed by formula (6) and the distribution of electrostatic capacitance $C(x,y)$ detected by the touch panel 14 approach. Specifically, in the present embodiment, the values of the various parameters included in the mathematical distribution model $G(x,y)$ are calculated so that a cost function expressing the deviation between the mathematical distribution model $G(x,y)$ and the distribution of electrostatic capacitance $C(x,y)$ detected by the touch panel 14 becomes smaller. As the cost function, squared error or generalized KL divergence or any other cost function can be used. In particular, in the present embodiment, the cost function $J(C, G)$ is expressed by the generalized KL divergence as shown in formula (7).

$$J(C, G) \equiv \sum_x \sum_y \left( C(x, y) \log \frac{C(x, y)}{G(x, y)} - C(x, y) + G(x, y) \right) \quad (7)$$

In particular, in the present embodiment, at the time of generation of a mathematical distribution model, considering the fact that the strengths of the distribution of electrostatic capacitance corresponding to the electrodes are similar, a normalization term which becomes larger when these are not similar is added to the cost function. Further, if a restrictive term is added to the cost function, the cost function $J(C, G)$ in the present embodiment is finally expressed as in formula (8).

$$J(C, G) \equiv \sum_x \sum_y \sum_k \sum_m \sum_n \left( C_{kmn}^{(s)}(x, y) \log \frac{C_{kmn}^{(s)}(x, y)}{\omega_k^{(s)} G_{kmn}^{(s)}(x, y)} - C_{kmn}^{(s)}(x, y) + \omega_k^{(s)} G_{kmn}^{(s)}(x, y) \right) + \quad (8)$$

$$\sum_x \sum_y \left( C^{(n)}(x, y) \log \frac{C^{(n)}(x, y)}{G^{(n)}(x, y)} - C^{(n)}(x, y) + G^{(n)}(x, y) \right) +$$

$$\beta^{(\omega)} \sum_k \left( \omega_{avg}^{(s)} \log \frac{\omega_{avg}^{(s)}}{\omega_k^{(s)}} - \omega_{avg}^{(s)} + \omega_k^{(s)} \right) +$$

$$\sum_k \left( \lambda^{(u_k)} \left( \sum_m u_{k,m} - 1 \right) + \lambda^{(v_k)} \left( \sum_n v_{k,n} - 1 \right) \right)$$

$$\omega_{avg}^{(s)} = \sum_k \omega_k^{(s)} / K \quad (9)$$

Note that, in formula (8), $\omega_{avg}^{(s)}$ is the average value of $\omega_k^{(s)}$ (k=1 to K) (see above formula (9)). Further, $\beta^{(\omega)}$ expresses the normalization weight. The larger this value, the closer the strengths of the partial normal distribution models included in the mixed normal distribution model expressing the distribution of electrostatic capacitance corresponding to all electrodes 43. Further, $\lambda^{(u_k)}$, $\lambda^{(v_k)}$ show Lagrange multipliers.

Further, in the present embodiment, the values of the various parameters of the mathematical distribution model are calculated so that the cost function $J(C,G)$ is minimized using the known optimization technique such as the auxiliary function method, Lagrange's method of undetermined multipliers, steepest descent method, or the like. In particular, in the present embodiment, the values of the various parameters of the mathematical distribution model are calculated so that the cost function $J(C,G)$ is minimized using the auxiliary function method.

Specifically, the values of the parameters are repeatedly updated so that the cost function partially differentiated by the parameters contained in the mathematical distribution model $G(x,y)$ becomes zero. For example, in updating $\omega_k^{(s)}$, $\omega_k^{(s)}$ giving $\partial J(C, G)/\partial \omega_k^{(s)}=0$ is repeatedly updated.

In the present embodiment, in the distribution of electrostatic capacitance $C(x,y)$ detected by the touch panel 14, the electrostatic capacitance component $C^{(s)}(x,y)$ and the noise component $C^{(n)}(x,y)$ are updated by the following formulas (10) to (12). Further, the noise component $G^{(n)}(x,y)$ in the mathematical distribution model is updated using $C^{(n)}(x,y)$ as shown in formula (13).

$$C^{(s)}(x, y) = \sum_k \sum_m \sum_n C^{(s)}_{kmn}(x, y) \quad (10)$$

$$C^{(s)}_{kmn}(x, y) = \frac{\omega^{(s)}_k G^{(s)}_{kmn}(x, y) C(x, y)}{G^{(s)}(x, y) + G^{(n)}(x, y)} \quad (11)$$

$$C^{(n)}(x, y) = \frac{G^{(n)}(x, y) C(x, y)}{G^{(s)}(x, y) + G^{(n)}(x, y)} \quad (12)$$

$$G^{(n)}(x, y) = C^{(n)}(x, y) \quad (13)$$

Further, the parameters $\omega_k^{(s)}$, $\tau_k^{(x)}$, $\tau_k^{(y)}$, $\sigma^{(x)}$, $\sigma^{(y)}$, $u_{k,m}$, $v_{k,n}$ are updated by the following formula (14) to formula (26) derived by rendering the cost function J(C, G) partially differentiated by these parameters zero.

$$\omega_k^{(s)} = \frac{\sum_x \sum_y \sum_m \sum_n C^{(s)}_{kmn}(x, y) + \beta^{(\omega)} \omega^{(s)}_{avg}}{\sum_x \sum_y \sum_m \sum_n G^{(s)}_{kmn}(x, y) + \beta^{(\omega)}} \quad (14)$$

$$\tau_k^{(x)} = \frac{\sum_x \sum_y \sum_m \sum_n (x - m\sigma^{(x)}) C^{(s)}_{kmn}(x, y)}{\sum_x \sum_y \sum_m \sum_n C^{(s)}_{kmn}(x, y)} \quad (15)$$

$$\tau_k^{(y)} = \frac{\sum_x \sum_y \sum_m \sum_n (y - n\sigma^{(y)}) C^{(s)}_{kmn}(x, y)}{\sum_x \sum_y \sum_m \sum_n C^{(s)}_{kmn}(x, y)} \quad (16)$$

$$\sigma^{(x)} = \frac{-b_\sigma + \sqrt{b_\sigma^2 - 4 a_\sigma c_\sigma}}{2 a_\sigma} \quad (17)$$

$$a_\sigma = \sum_x \sum_y \sum_k \sum_m \sum_n C^{(s)}_{kmn}(x, y) \quad (18)$$

$$b_\sigma = \sum_x \sum_y \sum_k \sum_m \sum_n m(x - \tau^{(x)}) C^{(s)}_{kmn}(x, y) \quad (19)$$

$$c_\sigma = \sum_x \sum_y \sum_k \sum_m \sum_n (x - \tau^{(x)})^2 C^{(s)}_{kmn}(x, y) \quad (20)$$

$$\sigma^{(x)} = \frac{-b_\sigma + \sqrt{b_\sigma^2 - 4 a_\sigma c_\sigma}}{2 a_\sigma} \quad (21)$$

$$a_\sigma = \sum_x \sum_y \sum_k \sum_m \sum_n C^{(s)}_{kmn}(x, y) \quad (22)$$

$$b_\sigma = \sum_x \sum_y \sum_k \sum_m \sum_n m(y - \tau^{(y)}) C^{(s)}_{kmn}(x, y) \quad (23)$$

$$c_\sigma = \sum_x \sum_y \sum_k \sum_m \sum_n (y - \tau^{(y)})^2 C^{(s)}_{kmn}(x, y) \quad (24)$$

$$u_{k,m} = \frac{\sum_x \sum_y \sum_n C^{(s)}_{kmn}(x, y)}{\sum_x \sum_y \sum_m \sum_n C^{(s)}_{kmn}(x, y)} \quad (25)$$

$$v_{k,m} = \frac{\sum_x \sum_y \sum_m C^{(s)}_{kmn}(x, y)}{\sum_x \sum_y \sum_m \sum_n C^{(s)}_{kmn}(x, y)} \quad (26)$$

Figure 12:
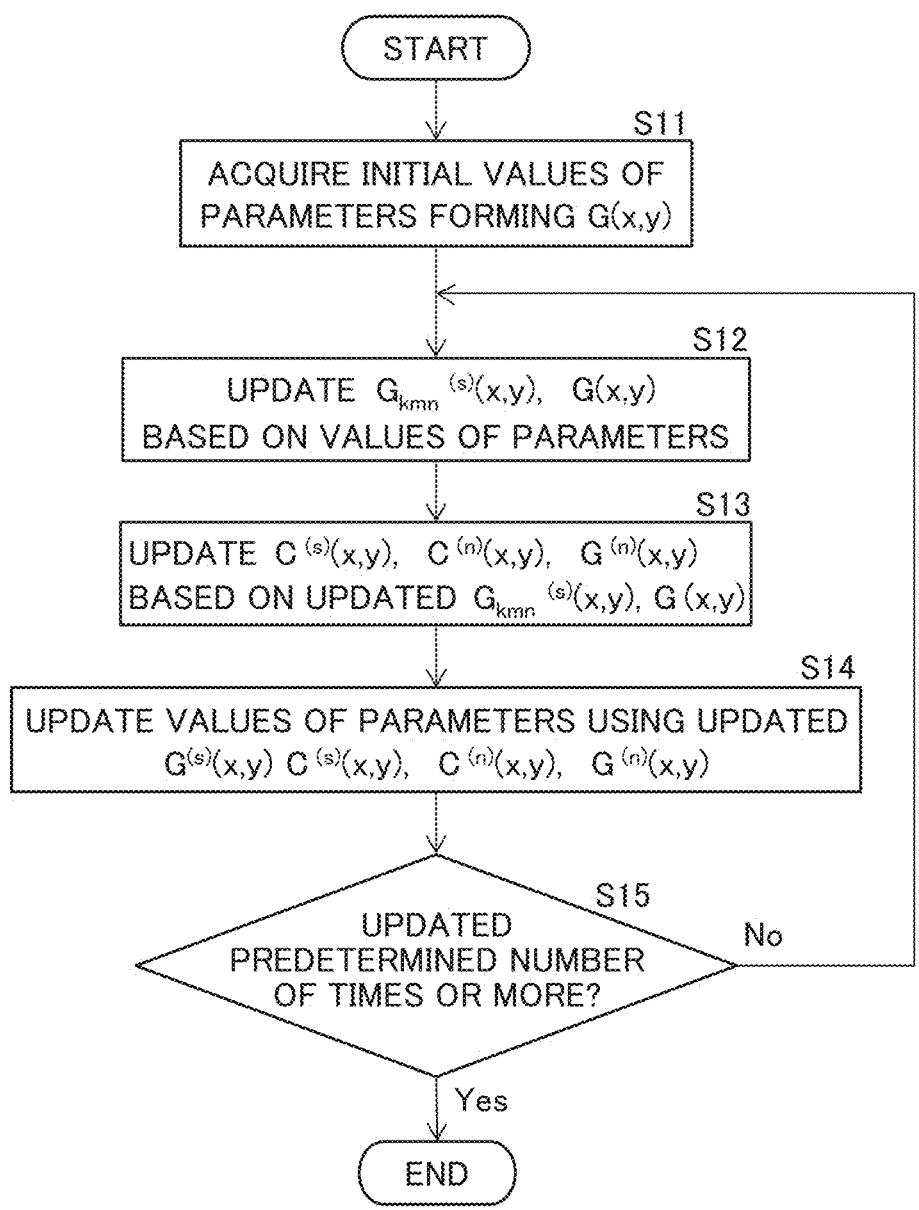
FIG. 12 is a flow chart showing a flow of processing for generation of a mathematical distribution model.

Next, referring to FIG. 12, the processing for generating a mathematical distribution model will be explained. FIG. 12 is a flow chart showing the flow of processing for generating a mathematical distribution model. The processing for generation shown in FIG. 12 is performed at the model generation part 181a of processor 18.

First, the model generation part 181a acquires the initial values of the parameters forming G(x,y) (for example, $\omega_k^{(s)}$, $\tau_k^{(x)}$, $\tau_k^{(y)}$, $\sigma^{(x)}$, $\sigma^{(y)}$, $u_{k,m}$, $v_{k,n}$, $G^{(n)}(x,y)$ (step S11). In particular, in the present embodiment, the initial values of the parameters are set in advance based on the positions of arrangement of the electrodes 43 and are stored in the memory part 17. Alternatively, the initial values of the parameters may, for example, be the values of these parameters calculated when the input device 20 is last attached. The model generation part 181a acquires the initial values of these parameters from the memory part 17.

Next, the model generation part 181a uses formula (4) to formula (6) to update $G_{kmn}^{(s)}(x,y)$ and G(x,y) based on the values of the parameters acquired at step S11 or the values of the parameters updated at the later explained step S14 (step S12). Next, the model generation part 181a updates $C^{(s)}(x,y)$, $C^{(n)}(x,y)$, and $G^{(n)}(x,y)$ using formula (10) to formula (13) based on the $G_{kmn}^{(s)}(x,y)$ and G(x,y) updated at step S12 (step S13). Next, the model generation part 181a updates the values of the parameters forming the G(x,y) ($\omega_k^{(s)}$, $\tau_k^{(x)}$, $\tau_k^{(y)}$, $\sigma^{(x)}$, $\sigma^{(y)}$, $u_{k,m}$, $v_{k,n}$) using formula (14) to formula (26) based on $G_{kmn}^{(s)}(x,y)$, $C^{(s)}(x,y)$, $C^{(n)}(x,y)$, and $G^{(n)}(x,y)$ updated at steps S12 and S13 (step S14).

Next, the model generation part 181a judges whether the values of the parameters have been updated greater than or equal to a predetermined reference number of times (step S15). That is, in the present embodiment, the model generation part 181a judges whether the values of the parameters are converging based on the number of times of updating. While it is judged at step S15 that the number of times of updating is less than the reference number of times, steps S12 to S14 are repeated. On the other hand, when at step S15 it is judged that the number of times of updating is greater than or equal to the reference number of times, the processing for generation of a mathematical distribution model is ended. Note that, the model generation part 181a judges whether the values of the parameters are converging based on the number of times of updating, but may also use another technique to judge if the values of the parameters are converging.

Detection of Operation Using Mathematical Distribution Model

In the present embodiment, when a mathematical distribution model is generated, an operation at an operating part 31 at any timing is detected based on the generated mathematical distribution model and the electrostatic capacitance detected by the touch panel 14 at that timing (second electrostatic capacitance). Below, referring to FIG. 13, detection of an operation at an operating part 31 utilizing a mathematical distribution model performed by the model usage detection part 181b of the processor 18 will be explained.

When an operating part 31 is operated as explained above, the electrostatic capacitance between the electrode 43 corresponding to the operating part 31 and the region of the touch panel 14 corresponding to that electrode 43 changes. At this time, the strength of the electrostatic capacitance changes without significant change in the shape of the distribution of electrostatic capacitance detected by the section of the touch panel 14 corresponding to that electrode 43. Further, when a certain operating part 31 is operated, the electrostatic capacitance detected at the section of the touch panel 14 corresponding to the electrode 43 corresponding to the operating part 31 changes, but the electrostatic capacitance detected at a section of the touch panel 14 not corresponding to that electrode 43 does not change. Therefore, when the operating part 31 is operated, the distribution of electrostatic capacitance detected at the section of the touch panel 14 corresponding to the electrode 43 corresponding to that operating part 31 changes overall with respect to the distribution of electrostatic capacitance detected at the section of the touch panel 14 corresponding to the electrode 43 when that operating part 31 is not being operated (in the present embodiment, when the operating part 31 is pushed, it becomes larger overall). On the other hand, even if the operating part 31 is operated, the distribution of electrostatic capacitance detected at a section of the touch panel 14 not corresponding to the electrode 43 corresponding to that operating part 31 does not change from the distribution of electrostatic capacitance detected at the section of the touch panel 14 when that operating part 31 is not being operated.

Therefore, the distribution of electrostatic capacitance C(x,y) detected by the touch panel 14 at any timing can be expressed by a set of values of the distribution of electrostatic capacitance expressed by a partial mathematical distribution model corresponding to each electrode 43 generated by the model generation part 181a multiplied by any strength ratio. Therefore, the distribution of electrostatic capacitance C(x,y) detected by the touch panel 14 at any timing can be expressed like in the following formula (27) and formula (28) by using non-negative matrix factorization (NMF) while fixing the mathematical distribution model obtained at the model generation part 181a.

$$C(x, y) \simeq \sum_k \omega_k^{(t)} G_k^{(t)}(x, y) \quad (27)$$

$$G_k^{(t)}(x, y) = \sum_m \sum_n \omega_k^{(s)} \overline{G_k^{(s)}}(x, y) \quad (28)$$

$G_k^{(t)}(x,y)$ shown by formula (28) shows a partial mathematical distribution model showing the distribution of electrostatic capacitance corresponding to the k-th electrode 43 included in the final mathematical distribution model generated by the model generation part 181a. Therefore, the values of the various parameters included in formula (28) (that is, $\omega_k^{(s)}, \tau_k^{(x)}, \tau_k^{(y)}, \sigma^{(x)}, \sigma^{(y)}, u_{k,m}, v_{k,n}$) are fixed to the values finally found by the model generation part 181a. Therefore, $G_k^{(t)}(x,y)$ is the structured partial mathematical distribution model with fixed parameters included in the formula. When detection of an operation at the operating part 31 is detected by the model usage detection part 181b, the values of these parameters are not updated. Therefore, $G_k^{(t)}(x,y)$ can be considered to be a template showing the distribution of electrostatic capacitance corresponding to the k-th electrode 43 when no operation is being performed by an operating part 31.

$\omega_k^{(t)}$ of formula (27) shows the strength ratio of the distribution of electrostatic capacitance corresponding to the k-th electrode 43 at any timing to the distribution of electrostatic capacitance corresponding to the k-th electrode 43 when no operation is being performed by an operating part 31. Therefore, if at any timing, the operating part 31 corresponding to the k-th electrode 43 is not being operated, $\omega_k^{(t)}$ becomes substantially 1. On the other hand, if at any timing, the operating part 31 corresponding to the k-th electrode 43 is being operated and the distribution of electrostatic capacitance corresponding to the k-th electrode 43 changes, $\omega_k^{(t)}$ becomes a value different from 1.

Therefore, in the present embodiment, it can be said that the distribution of electrostatic capacitance C(x,y) detected by the touch panel 14 at any timing may be broken down using non-negative matrix factorization into a distribution of electrostatic capacitance expressed by a partial mathematical distribution model relating to the distribution of electrostatic capacitance corresponding to each electrode 43 when an operating part 31 is not being operated, and a strength ratio of the distribution of electrostatic capacitance corresponding to the electrode 43 in the second electrostatic capacitance with respect to this distribution of electrostatic capacitance. Further, operation of the operating part 31 corresponding to this electrode 43 is detected based on the strength ratio found by breaking down in this way.

Specifically, in the present embodiment, the value of $\omega_k^{(t)}$ is calculated so that the distribution of the electrostatic capacitance expressed by the right side of formula (27) approaches the distribution C(x,y) of the electrostatic capacitance detected by the touch panel 14 at any timing. In particular, in the present embodiment, the value of $\omega_k^{(t)}$ is calculated so that the cost function showing the deviation between the distribution of the electrostatic capacitance expressed by the right side of formula (27) and the distribution C(x,y) of the electrostatic capacitance detected by the touch panel 14 at any timing expressed by the left side of formula (27) becomes smaller. As the cost function, it is possible to use squared error or generalized KL divergence or any other cost function. In the present embodiment, the cost function $J^{(t)}(C, G)$ is expressed by the squared error (Euclidean distance) as shown in formula (29).

$$J^{(t)}(C, G) \equiv \sum_x \sum_y \left( C(x, y) \log \frac{C(x, y)}{\sum_k \omega_k^{(t)} G_k^{(t)}(x, y)} - C(x, y) + \sum_k \omega_k^{(t)} G_k^{(t)}(x, y) \right) \quad (29)$$

Further, in the present embodiment, the value of $\omega_k^{(t)}$ is calculated so that the cost function $J^{(t)}(C, G)$ is minimized. In particular, in the present embodiment, the value of $\omega_k^{(t)}$ is calculated so that the cost function $J^{(t)}(C, G)$ is minimized using the auxiliary function method.

Specifically, the value of $\omega_k^{(t)}$ is repeatedly updated so that the cost function $J^{(t)}(C, G)$ differentiated by $\omega_k^{(t)}$ becomes zero ($dJ^{(t)}(C, G)/d\omega_k^{(t)}=0$). Therefore, $\omega_k^{(t)}$ is updated using the following formula (30) derived by making the cost function $J^{(t)}(C, G)$ differentiated by $\omega_k^{(t)}$ zero. Note that, $d_k(x,y)$ in formula (30) is expressed by the following formula (31):

$$\omega_k^{(t)} = \frac{\sum_x \sum_y C(x, y) d_k(x, y)}{\sum_x \sum_y \omega_k^{(t)} G_k^{(t)}(x, y)} \quad (30)$$

$$d_k(x, y) = \frac{\omega_k^{(t)} G_k^{(t)}(x, y)}{\sum_j \omega_j^{(t)} G_j^{(t)}(x, y)} \quad (31)$$

Further, in the present embodiment, if the thus updated value of the strength ratio $\omega_k^{(t)}$ is a predetermined value $\omega_{ref}$ larger than 1 (for example, 1.4) or more, the distribution of the electrostatic capacitance at the k-th electrode 43 greatly changes, and therefore it is judged the operating part 31 corresponding to the k-th electrode 43 is being operated (for example, is being pushed).

According to the present embodiment, the final mathematical distribution model generated by the model generation part 181a is used as a template and the strength ratio $\omega_k^{(t)}$ is calculated using non-negative matrix factorization. For this reason, it is possible to keep down the load in calculation at the processor 18 and detect an operation at an operating part 31 relatively accurately. Note that, as long as it is possible to calculate the strength ratio $\omega_k^{(t)}$, any techniques other than the non-negative matrix factorization such as the Gauss-Seidel method can be used.

Next, referring to FIG. 13, the processing for detection of an operation at an operating part 31 will be explained. FIG. 13 is a flow chart showing the flow of processing for detection of an operation at an operating part 31. The processing for detection shown in FIG. 13 is performed every predetermined time interval at the model usage detection part 181b of the processor 18. The predetermined time interval is, for example, equal to the reciprocal of the frame rate at the display part 13 and is, for example, tens of ms.

First, the model usage detection part 181b acquires the value of $\omega_k^{(t)}$ calculated at the previous detection processing (step S21). Next, the model usage detection part 181b updates the formula at the right side of formula (27) based on the value of $\omega_k^{(t)}$ acquired at step S21 or the value of $\omega_k^{(t)}$ updated at the later explained step S23 (step S22). Next, the model usage detection part 181b updates the value of $\omega_k^{(t)}$ using formula (30) and formula (31) based on the formula of the right side of formula (27) updated at step S22.

Next, the model usage detection part 181b judges whether the values of the parameters have been updated by greater than or equal to a predetermined reference number of times (step S24). Note that, the reference number of times may be just one time as well. In that case, step S24 is skipped. While it is judged at step S24 that the number of times of updating is less than the reference number of times, steps S22 to S23 are repeated. Note that, the model usage detection part 181b judges whether the value of $\omega_k^{(t)}$ is converging based on whether the number of times of updating is greater than or equal to the reference number of times, but it is also possible to use another technique to judge whether the value of $\omega_k^{(t)}$ is converging.

On the other hand, when it is judged at step S24 that the number of times of updating is greater than or equal to the reference number of times, the model usage detection part 181b judges that the operating part 31 corresponding to the electrode 43 (k-th electrode 43) corresponding to $\omega_k^{(t)}$ which has become greater than or equal to the predetermined value $\omega_{ref}$ is being operated (step S26).

In this regard, $d_k(x,y)$ expressed by formula (31) is a distribution function expressing the ratio of distribution of electrostatic capacitance corresponding to the k-th electrode 43 to the distribution of electrostatic capacitance at the touch panel 14 as a whole. Therefore, $d_k(x,y)$ can extract the distribution of electrostatic capacitance corresponding to the k-th electrode 43 included in the distribution of electrostatic capacitance at the touch panel 14 as a whole by multiplying $d_k(x,y)$ with the distribution of electrostatic capacitance of the touch panel 14 as a whole. Therefore, $d_k(x,y)$ expressed by formula (31) functions as a filter for extracting the distribution of electrostatic capacitance corresponding to the k-th electrode 43 from the distribution of electrostatic capacitance at the touch panel 14 as a whole.

Further, in calculating the value of $\omega_k^{(t)}$ (showing the strength ratio, as shown in formula (30), $C(x,y)d_k(x,y)$ is calculated. As explained above, since $d_k(x,y)$ functions as a filter, $C(x,y)d_k(x,y)$ can be said to extract the distribution of electrostatic capacitance corresponding to the k-th electrode 43 from the distribution of electrostatic capacitance $C(x,y)$ by applying a filter to the distribution of electrostatic capacitance $C(x,y)$ detected by the touch panel 14 as a whole. Further, $G_k^{(t)}(x,y)$ in formula (30) is a partial mathematical distribution model showing the distribution of electrostatic capacitance corresponding to the k-th electrode 43 included in the final mathematical distribution model generated by the model generation part 181a as explained above. Therefore, in the present embodiment, it can be said that an operation at the operating part 31 corresponding to the k-th electrode 43 is detected based on the distribution of electrostatic capacitance corresponding to the k-th electrode 43 calculated by provision of the filter, and the partial mathematical distribution model showing the distribution of electrostatic capacitance corresponding to the k-th electrode 43. In particular, in the present embodiment, the distribution of electrostatic capacitance corresponding to the k-th electrode 43 calculated by provision of the filter is divided by the partial mathematical distribution model showing the distribution of electrostatic capacitance corresponding to the k-th electrode 43 to calculate the above-mentioned strength ratio $\omega_k^{(t)}$, and based on the calculated strength ratio $\omega_k^{(t)}$, an operation at the operating part 31 corresponding to the k-th electrode 43 is detected. In the present embodiment, by using such a filter to calculate the strength ratio $\omega_k^{(t)}$, it is possible to detect an operation at the operating part 31 with good precision. Note that, such a filter may also be generated by another technique.

Effects and Variations

In the present embodiment, a change in the potential at an electrode 43 arranged on the touch panel 14 is detected by the touch panel 14 and operation of an operating part 31 corresponding to the electrode 43 is detected. Such detection of a change of potential of an electrode 43 is lower in S/N ratio compared with the case of detection of a person directly touching the touch panel 14. As opposed to this, in the present embodiment, a mathematical distribution model is used to detect a change of potential at an electrode 43 analytically. Therefore, it is possible to detect a change in potential of an electrode 43 with a relatively high precision and in turn possible to detect operation of an operating part 31 with a relatively high precision.

Further, in the present embodiment, as the mathematical distribution model, a normal distribution model is used. As explained above, since the distribution of electrostatic capacitance when a person or thing approaches the touch panel 14 becomes a distribution approximating a normal distribution, the distribution of electrostatic capacitance detected by the touch panel 14 can be approximated by a mathematical distribution model with a relatively high precision. Further, in the present embodiment, the distribution of electrostatic capacitance corresponding to one electrode 43 is approximated by a mixed normal distribution model. Therefore, even if the electrodes 43 are large or are specially shaped, the distribution of electrostatic capacitance detected by the touch panel 14 can be approximated by a mathematical distribution model with a relatively high precision.

In addition, in the present embodiment, the distribution of electrostatic capacitance generated by the plurality of electrodes 43 is approximated by a mixed normal distribution model. Therefore, even if a plurality of electrodes 43 are provided on the touch panel 14, the distribution of electrostatic capacitance detected by the touch panel 14 can be approximated by a mathematical distribution model with a relatively high precision.

Note that, in the present embodiment, the mathematical distribution model is generated by approximating the distribution of the electrostatic capacitance generated due to the electrodes 43 by a 2D normal distribution. However, the mathematical distribution model may also be generated by approximating the distribution of electrostatic capacitance generated due to the electrodes 43 by another known distribution, for example, by a binomial distribution.

Further, in the present embodiment, a mathematical distribution model including an electrostatic capacitance component and a noise component is used. Even if locally large noise is generated, it is possible to generate a mathematical distribution model suitably expressing the distribution of the electrostatic capacitance detected by the touch panel 14. However, a mathematical distribution model not including the noise component $G^{(n)}(x,y)$ may also be used.

Furthermore, in the above embodiment, operation at the operating part 31 is detected based on the first electrostatic capacitance and second electrostatic capacitance using the mathematical distribution model. However, operation of the operating part 31 may also be detected based on the first electrostatic capacitance and second electrostatic capacitance without using the mathematical distribution model. For example, an operation at an operating part 31 corresponding to an electrode 43 may also be detected based on the difference of the first electrostatic capacitance and second electrostatic capacitance at the section of the touch panel 14 corresponding to the electrode 43.

In addition, in the above embodiment, an operation at an operating part 31 is detected based on the first electrostatic capacitance and second electrostatic capacitance. However, instead of the electrostatic capacitances, an operation at the operating part 31 may be detected based on a value of a parameter relating to the electrostatic capacitance, including a parameter changing in accordance with the electrostatic capacitance. Specifically, for example, as a parameter relating to the electrostatic capacitance, current detected by the touch panel 14 may also be used.

Control of Electronic Apparatus Accompanied With Generation of Model

In this regard, when generating a mathematical distribution model relating to the distribution of the first electrostatic capacitance by the model generation part 181a, in other words, when detecting the distribution of the first electrostatic capacitance, no operating part 31 should be operated in the state where the input device 20 is attached to the electronic apparatus 10. In addition, when generating a mathematical distribution model by the model generation part 181a, preferably the user does not touch the touch panel 14. Therefore, in the present embodiment, when generating a mathematical distribution model by the model generation part 181a (when performing calibration), guidance is displayed at the display part 13 so that the user is discouraged from (and ideally does not) operate an operating part 31 or touch the touch panel 14.

FIG. 14 is a flow chart showing the flow of processing relating to display of guidance to the display part 13. The processing shown in FIG. 14 is mainly performed by the information processing part 182 of the processor 18.

The information processing part 182 first judges whether an execution condition for model generation processing relating to the distribution of the first electrostatic capacitance at the model generation part 181a (that is, the detection condition of the first electrostatic capacitance) is satisfied (step S31). The execution condition for model generation processing is satisfied at the timing when generation of a mathematical distribution model is necessary.

Specifically, the execution condition for model generation processing is satisfied, for example, when an application program utilizing operation information of an operating part 31 of the input device 20 is started up. In such an application program, although operating information of an operating part 31 of the input device 20 is required for running the application program, it is possible to generate a mathematical distribution model along with running the application program (that is, it is possible to calibrate the mathematical distribution model).

Further, the execution condition for model generation processing is satisfied, for example, when movement of the electronic apparatus 10 is detected by the motion detection sensor 15. Here, if the electronic apparatus 10 moves and is set at a location different from up to then, due to changes in the environment around the installation location, there is a possibility of a change in the distribution of the electrostatic capacitance detected by the tough panel 14 when no operating part 31 is being operated. By performing the model generation processing when movement of the electronic apparatus 10 is detected, it is possible to generate a mathematical distribution model matching with the changed distribution of the electrostatic capacitance even if the distribution of the electrostatic capacitance changes along with a change of the installation location.

Further, the execution condition for model generation processing is satisfied, for example, when a USB cable or other outside cable is inserted/withdrawn to or from the electronic apparatus 10. If an outside cable is inserted into/withdrawn from the electronic apparatus 10, although there is a possibility of the potential of an electrode 43 changing, it is possible to generate a mathematical distribution model matching with the distribution of the electrostatic capacitance after insertion/withdrawal of the cable In addition, the execution condition for model generation processing may be satisfied when it has been confirmed that the user is not touching the touch panel 14, input device 20, electronic apparatus 10, or the like. Specifically, the information processing part 182 makes the display part 13 display a message confirming with the user that he is not touching the operating part 31, touch panel 14, input device 20, electronic apparatus 10, or the like, when an operation occurs where the above-mentioned execution condition is satisfied, or the like. Further, when input of an operation for confirming this has been performed by the user through the touch panel 14 or separate operating device, the information processing part 182 judges that the execution condition for model generation processing is satisfied.

If at step S31 it has been judged that the execution condition for model generation processing is not satisfied, the processing is ended. On the other hand, if at step S31 it has been judged that the execution condition for model generation processing is satisfied, the information processing part 182 makes the display part 13 display guidance so that the user does not operate the operating part 3 and the user does not touch the touch panel 14 (step S32). The guidance prompting the user to not operate an operating part 31 may be guidance prompting the user to not touch the input device 20. Further, the guidance for prompting the user to not touch the touch panel 14 may be guidance for prompting the user to not touch the electronic apparatus 10. Due to such guidance being displayed, during execution of the model generation processing, the user is kept from operating an operating part 31 or touching the touch panel 14 and thereby a suitable mathematical distribution model can be generated. Note that, guidance prompting the user to not touch the touch panel 14 may not be displayed at the display part 13.

Next, the detection part 181 performs processing for generation of a model shown in FIG. 12 (step S33). Therefore, the detection part 181 detects the electrostatic capacitance detected by the touch panel 14 as the first electrostatic capacitance while guidance is being displayed at the display part 13. After that, the information processing part 182 erases the display of the display part 13 which had been displayed at step S32, when the processing for generation of a model by a detection part 181 is completed (step S34). At this time, the information processing part 182 may make the display part 13 display guidance indicating that the user may touch an operating part 31 or touch panel 14.

Above, example embodiments according to the present disclosure were explained, but the present disclosure is not limited to these embodiments and can be corrected and changed in various ways within the language of the claims.

What is claimed is:

1. An electronic apparatus which can be equipped with an input device provided with an electrode which changes in potential by an operating part being operated, the electronic apparatus comprising:
   a touch screen provided with a display part configured to display an image and an electrostatic capacitance type touch panel arranged at a position superposed with the display part; and
   a processor configured to detect operation at the operating part, wherein
   the touch panel is configured to detect a value of a parameter relating to an electrostatic capacitance formed between a region of the touch panel corresponding to the electrode and the electrode and changing in accordance with a change in potential of the electrode in a state where the input device is attached to the electronic apparatus, and
   the processor is configured to detect operation at the operating part at any timing based on a first parameter value expressed by the value of the parameter detected by the touch panel when no operating part is being operated in the state where the input device is attached to the electronic apparatus, and a second parameter value expressed by the value of the parameter detected by the touch panel at any timing after the first parameter value is detected in the state where the input device is attached to the electronic apparatus.

2. The electronic apparatus according to claim 1, wherein
   the input device is provided with a plurality of operating parts and a plurality of electrodes corresponding to the operating parts,
   the plurality of electrodes are arranged at different positions of the touch panel in the state where the input device is attached to the electronic apparatus, and
   the processor is configured to detect the operation at the operating part corresponding to each electrode based on the value of the parameter corresponding to the electrostatic capacitance corresponding to each electrode among the first parameter values, and the value of the parameter corresponding to the electrostatic capacitance corresponding to each electrode among the second parameter values.

3. The electronic apparatus according to claim 1, wherein
   the electronic apparatus is further provided with an information processing part configured to control display of the display part,
   the information processing part is configured to control the display part to display guidance discouraging a user from operating an operating part when a detection condition for detecting the first parameter value stands, and
   the processor is configured to detect the value of a parameter detected by the touch panel during display of guidance as the first parameter value.

4. The electronic apparatus according to claim 3, wherein
   the information processing part is configured to perform processing according to an application program utilizing operating information of the operating part, and
   the detection condition is satisfied when the application program is started up.

5. The electronic apparatus according to claim 1, wherein
   the electronic apparatus further comprises an information processing part configured to control display of the display part,
   the information processing part is configured to control the display part to display guidance discouraging a user from touching the touch panel when a detection condition for detecting the first parameter value is satisfied, and
   the processor is configured to detect the value of the parameter detected by the touch panel during display of the guidance as the first parameter value.

6. The electronic apparatus according to claim 1, wherein:
   the display part is controllable to display guidance discouraging interaction with the operating part and/or the touch panel when a detection condition for detecting the first parameter value is satisfied, and
   the processor is configured to detect the value of a parameter detected by the touch panel during display of guidance as the first parameter value.

7. The electronic apparatus according to claim 6, wherein the detection condition is satisfied when an application program is started up in connection with the electronic apparatus.

8. The electronic apparatus according to claim 1, wherein the electronic apparatus is a game apparatus.

9. An electronic apparatus which can be equipped with an input device provided with an electrode which changes in potential by an operating part being operated, the electronic apparatus comprising:
   a touch screen provided with a display part configured to display an image and an electrostatic capacitance type touch panel arranged at a position superposed with the display part; and
   a processor configured to detect operation at the operating part,
   wherein the touch panel is configured to detect a value of a parameter relating to an electrostatic capacitance formed between a region of the touch panel corresponding to the electrode and the electrode and changing in accordance with a change in potential of the electrode in a state where the input device is attached to the electronic apparatus, and
   wherein the processor is further configured to:
      detect operation at the operating part at any timing based on a first parameter value expressed by the value of the parameter detected by the touch panel when no operating part is being operated in the state where the input device is attached to the electronic apparatus, and a second parameter value expressed by the value of the parameter detected by the touch panel at any timing after the first parameter value is detected in the state where the input device is attached to the electronic apparatus,
      generate a mathematical distribution model relating to distribution of the first parameter value based on the first parameter value; and detect the operation at the operating part based on the generated mathematical distribution model and the second parameter value.

10. The electronic apparatus according to claim 9, wherein the mathematical distribution model is a normal distribution model.

11. The electronic apparatus according to claim 10, wherein the normal distribution model is a mixed normal distribution model.

12. The electronic apparatus according to claim 9, wherein
the input device is provided with a plurality of electrodes configured to change in potential by a plurality of operating parts being operated,
the plurality of electrodes are arranged at different positions of the touch panel in the state where the input device is attached to the electronic apparatus, and
the processor is configured to generate the mathematical distribution model as a set of partial mathematical distribution model corresponding to each electrode based on the first parameter value.

13. The electronic apparatus according to claim 12, wherein the partial mathematical distribution model is a mixed normal distribution model.

14. The electronic apparatus according to claim 12, wherein the processor is configured to break down a second parameter value into a distribution of the value of the parameter corresponding to the electrostatic capacitance expressed by the partial mathematical distribution model corresponding to each electrode when no operating part is being operated, and a strength ratio of the value of the parameter corresponding to the electrostatic capacitance corresponding to each electrode in the second parameter value with respect to the value of the parameter, and detect the operation of the operating part corresponding to each electrode based on the strength ratio.

15. The electronic apparatus according to claim 14, wherein the processor is configured to use a non-negative matrix factorization to break down the second parameter value.

16. The electronic apparatus according to claim 12, wherein the processor is configured to generate a filter for extracting the value of the parameter corresponding to the electrostatic capacitance corresponding to each electrode from the second parameter value based on the generated mathematical distribution model, apply the filter to the second parameter value detected by the touch panel to calculate the value of the parameter corresponding to the electrostatic capacitance corresponding to each electrode, and detect the operation at the operating part corresponding to each electrode based on the value of the parameter corresponding to the electrostatic capacitance corresponding to each electrode calculated from the second parameter value and the partial mathematical distribution model corresponding to each electrode.

17. An electronic apparatus set comprising an input device and an electronic apparatus which can be equipped with the input device, wherein
the input device includes an operating part to be operated by the user, and an electrode changing in potential by the operating part being operated,
the electronic apparatus includes a touch screen provided with a display part configured to display an image and an electrostatic capacitance type touch panel arranged at a position superposed with the display part, and a processor configured to detect operation at the operating part,
the touch panel is configured to detect a value of a parameter relating to an electrostatic capacitance formed between a region of the touch panel corresponding to the electrode and the electrode and changing in accordance with a change in potential of the electrode in the state where an input device is attached to the electronic apparatus, and
the processor is configured to detect operation at the operating part at any timing based on a first parameter value expressed by the value of the parameter detected by the touch panel when no operating part is being operated in the state where the input device is attached to the electronic apparatus, and a second parameter value expressed by the value of the parameter detected by the touch panel at any timing after the first parameter value is detected in the state where the input device is attached to the electronic apparatus.

18. The electronic apparatus according to claim 17, wherein:
the display part is controllable to display guidance discouraging interaction with the operating part and/or the touch panel when a detection condition for detecting the first parameter value is satisfied, and
the processor is configured to detect the value of a parameter detected by the touch panel during display of guidance as the first parameter value.

19. The electronic apparatus according to claim 18, wherein the detection condition is satisfied when an application program is started up in connection with the electronic apparatus.

20. The electronic apparatus according to claim 17, wherein the electronic apparatus is a game apparatus.

* * * * *